US012710517B2

(12) United States Patent
Lee et al.

(10) Patent No.: US 12,710,517 B2
(45) **Date of Patent: *Aug. 18, 2026**

(54) SYSTEMS, METHODS, AND MEDIA FOR IMPROVING SIGNAL-TO-NOISE RATIO IN SINGLE-PHOTON DATA

(71) Applicant: Wisconsin Alumni Research Foundation, Madison, WI (US)

(72) Inventors: Jongho Lee, Madison, WI (US); Mohit Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/601,973

(22) Filed: Mar. 11, 2024

(65) Prior Publication Data

US 2025/0035761 A1 Jan. 30, 2025

Related U.S. Application Data

(63) Continuation of application No. 18/162,397, filed on Jan. 31, 2023, now Pat. No. 11,927,700.

(51) Int. Cl.

*G01S 7/497* (2006.01)
*G01S 17/89* (2020.01)
*H04N 23/81* (2023.01)

(52) U.S. Cl.

CPC .............. *G01S 7/497* (2013.01); *G01S 17/89* (2013.01); *H04N 23/81* (2023.01)

(58) Field of Classification Search

CPC .......... G01S 7/497; G01S 17/89; H04N 23/81
See application file for complete search history.

(56) References Cited

U.S. PATENT DOCUMENTS 10,917,626 B2 2/2021 Akkaya et al.
12,078,720 B2 * 9/2024 Gupta .................... G01S 17/10
2012/0057059 A1 3/2012 Eldesouki et al.

OTHER PUBLICATIONS

Bergmann, A. Spcimage: data analysis software for fluorescence lifetime imaging microscopy. Becker & Hickl GmbH, beckerhickl.com [beckerhickl.com] (2003).

(Continued)

*Primary Examiner* — Kevin K Pyo
(74) *Attorney, Agent, or Firm* — Andrus Intellectual Property Law, LLP

(57) ABSTRACT

In accordance with some embodiments, systems, methods, and media for improving signal-to-noise ratio in single-photon data are provided. In some embodiments, a system comprises: a processor programmed to: generate, for each of a plurality of pixel locations, initial photon flux estimates based on a first set of photon transients including photon transients associated with the pixel location and neighboring pixel locations, each of the photon transients comprises a histogram of photon counts; identify, for a scene patch associated with each of the plurality of pixel locations, one or more similar scene patches using intensity information for each of the plurality of pixel locations; and generate, for each of the plurality of pixel locations, final photon flux estimates based on a second set of photon transients including photon transients associated with the scene patch and each of the one or more similar scene patches.

20 Claims, 23 Drawing Sheets

(56) References Cited

OTHER PUBLICATIONS

Grecco, H. E., Roda-Navarro, P. & Verveer, P. J. Global analysis of time correlated single photon counting fret-flim data. Opt. Express 17, 6493-6508 (2009).
Lindell, D. B., O'Toole, M. &Wetzstein, G. Single-photon 3d imaging with deep sensor fusion. ACM Trans. Graph. 37, 113-1 (2018).
Maggioni, M., Boracchi, G., Foi, A. & Egiazarian, K. Video denoising, deblocking, and enhancement through separable 4-d nonlocal spatiotemporal transforms. IEEE Trans. image Process. 21, 3952-3966 (2012).
Maggioni, M., Katkovnik, V., Egiazarian, K. & Foi, A. Nonlocal transform-domain filter for volumetric data denoising and reconstruction. IEEE Trans. image Process. 22, 119-133 (2012).
O'Toole, M. et al. Reconstructing transient images from singlephoton sensors. In Proc. IEEE Conference on Computer Vision and Pattern Recognition, 1539-1547 (2017).
Rapp, J. & Goyal, V. K. A few photons among many: unmixing signal and noise for photon-efficient active imaging. IEEE Trans. Comput. Imaging 3, 445-459 (2017).
Turin, G. An introduction tomatched filters. IRE Trans. Inf. theory 6, 311-329 (1960).
Warren, S. C. et al. Rapid global fitting of large fluorescence lifetime imaging microscopy datasets. PLoS ONE 8, e70687 (2013).

* cited by examiner

CASPI

Ground-truth depth
Learning-based
w/o intensity
w/ intensity
CASPI + MF
w/o intensity
w/ intensity
$(N_{sig}/N_{bkg})$: (2/50)
Inlier %: 21/45/73
23/56/84
46/82/94
47/82/94
(100/100)
11/28/61
7/19/45
51/95/99
51/95/99
(10/2,000)
1/2/4
12/23/35
41/79/95
41/80/96
(0.2/10)
10/26/39
14/38/61
19/51/76
21/53/78
(0.1/0)
9/24/43
18/40/64
27/56/78
25/54/79

Spatial binning + MLE x
y
z

Frame 5

Frame 12

SYSTEMS, METHODS, AND MEDIA FOR IMPROVING SIGNAL-TO-NOISE RATIO IN SINGLE-PHOTON DATA

CROSS-REFERENCE TO RELATED APPLICATIONS

This application is a continuation of U.S. application Ser. No. 18/162,397, filed Jan. 31, 2023, which application is incorporated herein by reference in its entirety.

STATEMENT REGARDING FEDERALLY SPONSORED RESEARCH

This invention was made with government support under 1943149 awarded by the National Science Foundation. The government has certain rights in the invention.

BACKGROUND

Single-photon cameras (SPCs) are rapidly becoming a technology of choice in active imaging due to their extreme sensitivity to individual photons and their ability to time-tag photon arrivals with nano-to-picosecond resolution. Unlike conventional cameras, SPCs enable image sensing at the fundamental limit imposed by the physics of light: an individual photon. However, SPCs can generate data with a low signal-to-noise ratio in non-ideal conditions, such as in environments with high background illumination, and in photon-starved environments.

Accordingly, new systems, methods, and media for improving signal-to-noise ratio in single-photon data are provided.

SUMMARY

In accordance with some embodiments of the disclosed subject matter, systems, methods, and media for improving signal-to-noise ratio in single-photon data are provided.

In accordance with some embodiments of the disclosed subject matter, a system for generating single-photon imaging data with improved signal-to-noise ratio is provided, the system comprising: at least one hardware processor that is programmed to: generate, for each of a plurality of pixel locations, initial photon flux estimates based on a first set of photon transients including a photon transient associated with the pixel location and photon transients associated with neighboring pixel locations, wherein each of the photon transients comprises a histogram of photon counts during a plurality of time bins at the pixel location; identify, for a scene patch associated with each of the plurality of pixel locations, one or more similar scene patches using intensity information for each of the plurality of pixel locations; and generate, for each of the plurality of pixel locations, final photon flux estimates based on a second set of photon transients including photon transients associated with the scene patch and each of the one or more similar scene patches.

In some embodiments, the system further comprises: a light source; and an image sensor comprising a single-photon detector; wherein the at least one hardware processor is further programmed to: cause the light source to emit a sequence of n pulses toward a scene; receive, from the single-photon detector, information indicative of arrival times of light from the scene; generate a first photon transient corresponding to a first pixel location using the information indicative of arrival times of light from the scene; and generate a 3D photon transient cube comprising a plurality of photon transients, each of the plurality of photon transients associated with a particular pixel location.

In some embodiments, the at least one hardware processor is further programmed to: generate, for each of the plurality of pixel locations, a set of photon transients including a photon transient associated with that pixel location and photon transients associated with neighboring pixel locations; calculate, for each set of photon transients, a plurality of transform coefficients; estimate, for each set of photon transients, a noise level based on a noise band and the plurality of transform coefficients calculated for that set of photon transients, wherein the noise band is based on a profile of a light source used to generate the photon transients; modify, for each set of photon transients, at least a subset of the plurality of transform coefficients based on the noise level, thereby generating a plurality of modified transform coefficients; calculate, for each set of photon transients, an inverse transform using the plurality of modified transform coefficients associated with that set of photon transients, wherein the inverse transform produces a set of modified photon transients; generate, for each pixel location, photon flux estimates based on each modified photon transient associated with that pixel location.

In some embodiments, the transform is a Fourier transform, and the transform coefficients are Fourier coefficients.

In some embodiments, the noise level is based on an average magnitude of a set of transform coefficients of the plurality of transform coefficients that falls within the noise band.

In some embodiments, the at least one hardware processor is further programmed to: determine, for each set of photon transients, an energy of transform coefficients within the noise band; determine, for each set of photon transients, an energy of transform coefficients outside of the noise band; and select a noise reduction algorithm based on a ratio of the energy of transform coefficients within the noise band to the energy of transform coefficients outside of the noise band.

In some embodiments, the at least one hardware processor is further programmed to: determine, for each set of photon transients, a noise threshold based on the noise level; and modify, for each set of photon transients, the subset of the plurality of transform coefficients that fall below the noise threshold to zero.

In some embodiments, the at least one hardware processor is further programmed to: generate, for each set of photon transients, a set of intensity values corresponding to the pixel locations associated with the set of photon transients; calculate, for each set of intensity values, a second plurality of transform coefficients; and perform an element-wise multiplication between the second plurality of transform coefficients and elements of the first plurality of transform coefficients thereby generating the plurality of modified transform coefficients.

In some embodiments, the at least one hardware processor is further programmed to: modify, for each set of photon transients, at least a subset of the plurality of transform coefficients based on the noise level and the photon flux estimates, thereby generating a second plurality of modified transform coefficients; calculate, for each set of photon transients, an inverse transform using the second plurality of modified transform coefficients associated with that set of photon transients, wherein the inverse transform produces a second set of modified photon transients; generate, for each pixel location, the initial photon flux estimates based on each modified photon transient in the second set of modified photon transients associated with that pixel location.

In some embodiments, the at least one hardware processor is further programmed to: generate the second plurality of modified transform coefficients using Wiener filtering.

In some embodiments, the at least one hardware processor is further programmed to: generate, for each of the plurality of pixel locations, a second set of photon transients including a photon transient associated with that pixel location and photon transients associated with neighboring pixel locations based on the photon flux estimates; associate, for each second set of photon transients, one or more sets of photon transients corresponding to the one or more similar scene patches to the scene patch associated with that set of photon transients, thereby generating a plurality of 4D sets of photon transients; calculate, for each of the plurality of 4D sets of photon transients, a plurality of transform coefficients; estimate, for each set of photon transients, a noise level based on a noise band and the plurality of transform coefficients calculated for that 4D set of photon transients, wherein the noise band is based on a profile of a light source used to generate the photon transients; modify, for each 4D set of photon transients, at least a subset of the plurality of transform coefficients based on the noise level, thereby generating a third plurality of modified transform coefficients; calculate, for each 4D set of photon transients, an inverse transform using the third plurality of modified transform coefficients associated with that set of photon transients, wherein the inverse transform produces a third set of modified photon transients; generate, for each pixel location, second photon flux estimates based on each modified photon transient associated with that pixel location in the third set of modified photon transients.

In some embodiments, the transform is a Fourier transform, and the transform coefficients are Fourier coefficients.

In some embodiments, the noise level is based on an average magnitude of a set of transform coefficients of the plurality of transform coefficients that falls within the noise band.

In some embodiments, the at least one hardware processor is further programmed to: determine, for each 4D set of photon transients, an energy of transform coefficients within the noise band; determine, for each 4D set of photon transients, an energy of transform coefficients outside of the noise band; and select a noise reduction algorithm based on a ratio of the energy of transform coefficients within the noise band to the energy of transform coefficients outside of the noise band.

In some embodiments, the at least one hardware processor is further programmed to: determine, for each 4D set of photon transients, a noise threshold based on the noise level; and modify, for each 4D set of photon transients, the subset of the plurality of transform coefficients that fall below the noise threshold to zero.

In some embodiments, the at least one hardware processor is further programmed to: generate, for each 4D set of photon transients, a set of intensity values corresponding to the pixel locations associated with the set of photon transients; calculate, for each 4D set of intensity values, a third plurality of transform coefficients; and perform an element-wise multiplication between the third plurality of transform coefficients and elements of the plurality of transform coefficients associated with that 4D set of photon transients thereby generating the third plurality of modified transform coefficients.

In some embodiments, the at least one hardware processor is further programmed to: modify, for each 4D set of photon transients, at least a subset of the plurality of transform coefficients based on the noise level and the second photon flux estimates, thereby generating a third plurality of modified transform coefficients; calculate, for each 4D set of photon transients, an inverse transform using the third plurality of modified transform coefficients associated with that 4D set of photon transients, wherein the inverse transform produces a third set of modified photon transients; and generate, for each pixel location, the final photon flux estimates based on each modified photon transient in the third set of modified photon transients associated with that pixel location.

In some embodiments, the at least one hardware processor is further programmed to: generate the third plurality of modified transform coefficients using Wiener filtering.

In accordance with some embodiments of the disclosed subject matter, a method for generating single-photon imaging data with improved signal-to-noise ratio is provided, the method comprising: generating, for each of a plurality of pixel locations, initial photon flux estimates based on a first set of photon transients including a photon transient associated with the pixel location and photon transients associated with neighboring pixel locations, wherein each of the photon transients comprises a histogram of photon counts during a plurality of time bins at the pixel location; identifying, for a scene patch associated with each of the plurality of pixel locations, one or more similar scene patches using intensity information for each of the plurality of pixel locations; and generating, for each of the plurality of pixel locations, final photon flux estimates based on a second set of photon transients including photon transients associated with the scene patch and each of the one or more similar scene patches.

In accordance with some embodiments of the disclosed subject matter, a non-transitory computer readable medium containing computer executable instructions that, when executed by a processor, cause the processor to perform a method for generating single-photon imaging data with improved signal-to-noise ratio is provided, the method comprising: generating, for each of a plurality of pixel locations, initial photon flux estimates based on a first set of photon transients including a photon transient associated with the pixel location and photon transients associated with neighboring pixel locations, wherein each of the photon transients comprises a histogram of photon counts during a plurality of time bins at the pixel location; identifying, for a scene patch associated with each of the plurality of pixel locations, one or more similar scene patches using intensity information for each of the plurality of pixel locations; and generating, for each of the plurality of pixel locations, final photon flux estimates based on a second set of photon transients including photon transients associated with the scene patch and each of the one or more similar scene patches.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

Figure 17A:
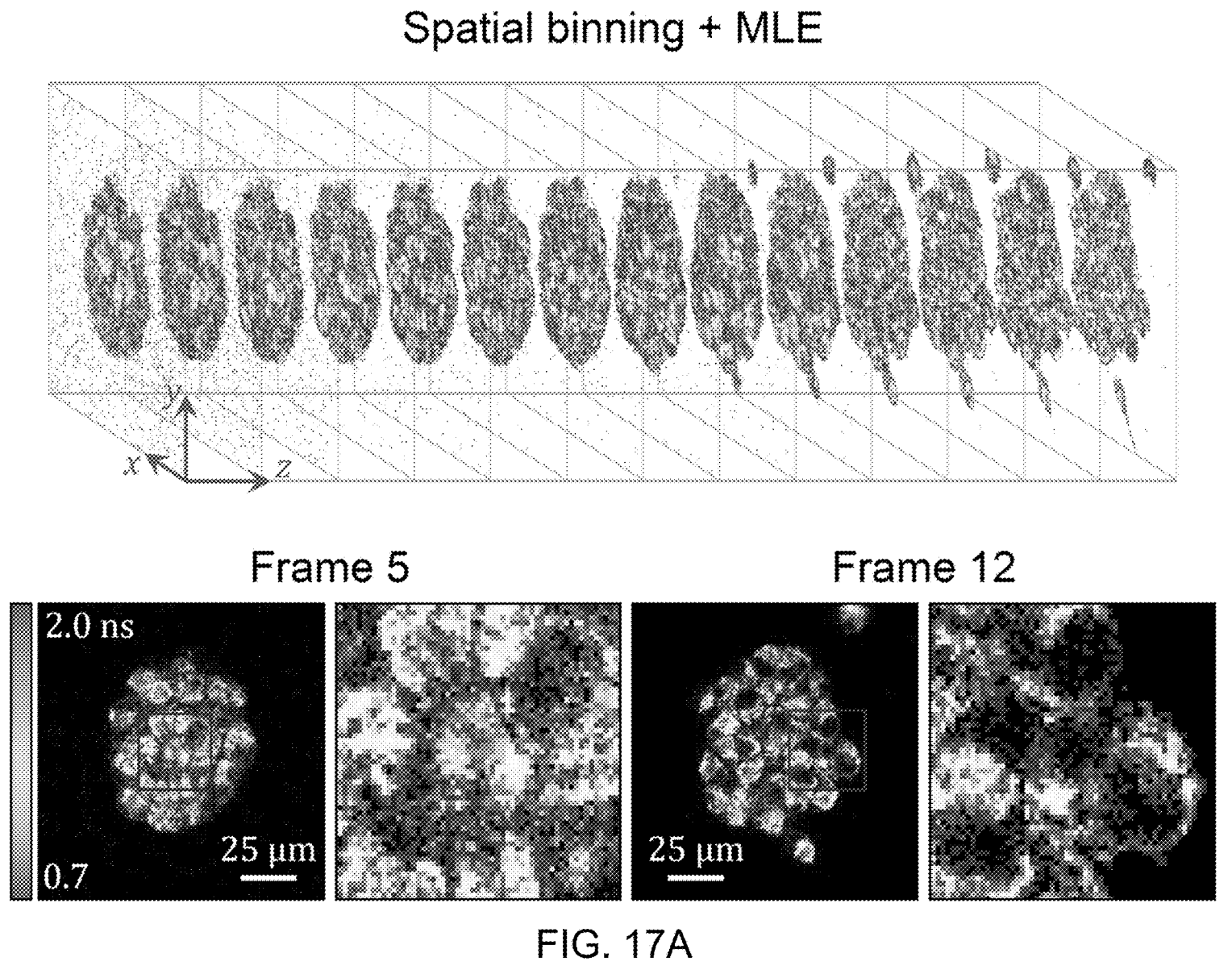

FIG. 17A shows examples of spatial sequences of fluorescent lifetime imaging microscopy images and individual frames generated from photon transient data using a spatial binning technique and maximum likelihood estimate, including techniques implemented in accordance with some embodiments of the disclosed subject matter.

DETAILED DESCRIPTION

Figure 1A:
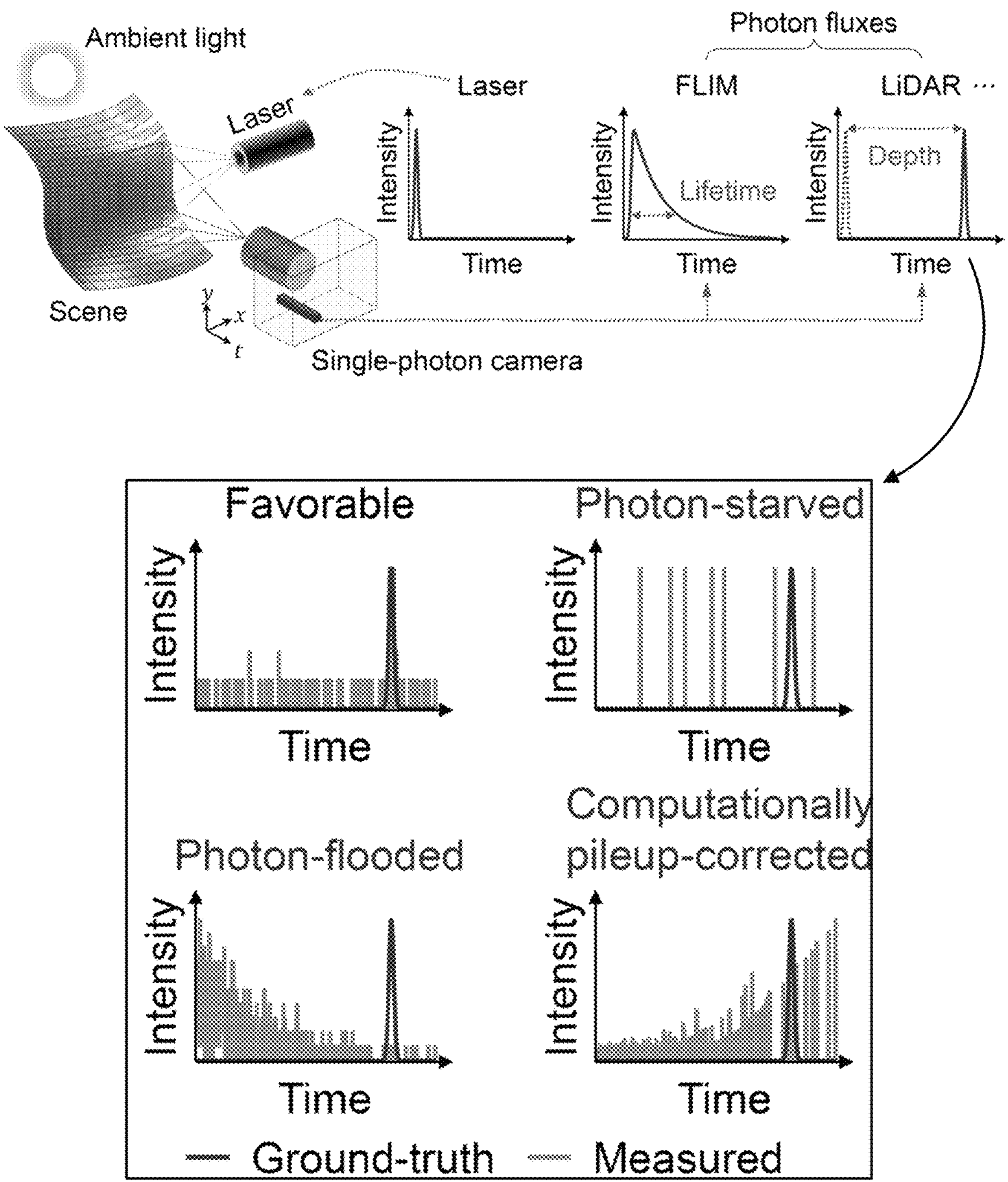
FIG. 1A shows an example setup for estimating a depth of a portion of a scene using an array of single-photon detectors and a light source in accordance with some embodiments of the disclosed subject matter, and transient histograms generated by a single-photon detector of the array under various conditions.

In accordance with various embodiments, mechanisms (which can, for example, include systems, methods, and media) for improving signal-to-noise ratio in single-photon data are provided.

In some embodiments, mechanisms described herein can be used to implement photon processing techniques for single-photon cameras (SPCs) which are widely used for active imaging. Active imaging, in which an image sensor can be operated in unison with a controllable illumination source (e.g., a pulsed laser), can facilitates the estimation of various scene properties in a wide range of applications, such as depth measurement (e.g., an RGBD camera, a light detection and ranging (LiDAR), etc.), fluorescence lifetime imaging microscopy (FLIM), non-line-of-sight imaging, astronomy, low-light imaging, etc. To estimate scene features, active imaging systems often require extremely precise measurements of light intensity from the scene as a function of position and time. For example, FLIM facilitates the detection of tissue pathology (e.g. malignant vs. healthy tissue) by monitoring fine-grained temporal decay of fluorescence emission. As another example, LiDAR can estimate 3D scene structures (e.g., in robotics, computer vision, autonomous driving applications) with millimeter-to-centimeter depth resolution. Such applications require photon timing information to be captured with sub-nanosecond precision.

In some embodiments, mechanisms described herein can improve scene property estimation in a wide range of active imaging applications. For example, mechanisms described herein can facilitate LiDAR imaging over a wide range of photon flux levels, from a sub-photon regime (e.g., with less than 1 average signal photon received per pixel over all laser cycles) to extremely high ambient sunlight regime (e.g., more than 20,000 lux) and live-cell autofluorescence FLIM in extremely low photon count regimes (e.g., 10 photons per pixel per cycle) where state-of-the-art techniques fail to provide reliable lifetime estimates.

In some embodiments, mechanisms described herein (sometimes referred to generally herein as collaborative photon processing for active single-photon imaging (CASPI)) can be used as a basic building block of general-purpose photon processing unit (e.g., analogous to conventional image processing units) that can be implemented on-chip in future single-photon camera sensor hardware. In some embodiments, mechanisms described herein can be versatility, tuning-free, and training-free operation. In 3D imaging, mechanisms described herein can enable long-range low-power flash LiDARs for autonomous vehicles and robotic platforms. In some embodiments, mechanisms described herein can facilitate real-time in vivo observation of fluorescence lifetime contrasts in biomedical imaging applications to assess metabolism or systemic changes due to cellular activity.

In some embodiments, mechanisms described herein can utilize cubelet-based transforms (e.g., as described below in connection with FIGS. 2A to 3D). Processing each cubelet sequentially can result in relatively long compute times (e.g., on the order of minutes with 256×256×256 photon transient cubes by unoptimized MATLAB implementation). In some embodiments, each cubelet can be processed independently (e.g., in parallel), making mechanisms described herein amenable to massively parallel processing (e.g. on low-power graphic processing units (GPUs)), which can facilitate real-time implementations. Further speed-ups can be realized by implementing transforms (e.g., fast Fourier transforms, wavelet transforms, etc.) in hardware and/or computing them optically. Additionally, in some embodiments, considering that the temporal locations of signal features also convey important information in specific applications (e.g., LiDAR), wavelet transforms can be expected to achieve better performance than Fourier transforms in recovering photon fluxes.

FIG. 1A shows an example setup for estimating a depth of a portion of a scene using an array of single-photon detectors and a light source in accordance with some embodiments of the disclosed subject matter, and transient histograms generated by a single-photon detector of the array under various conditions.

Figure 1B:
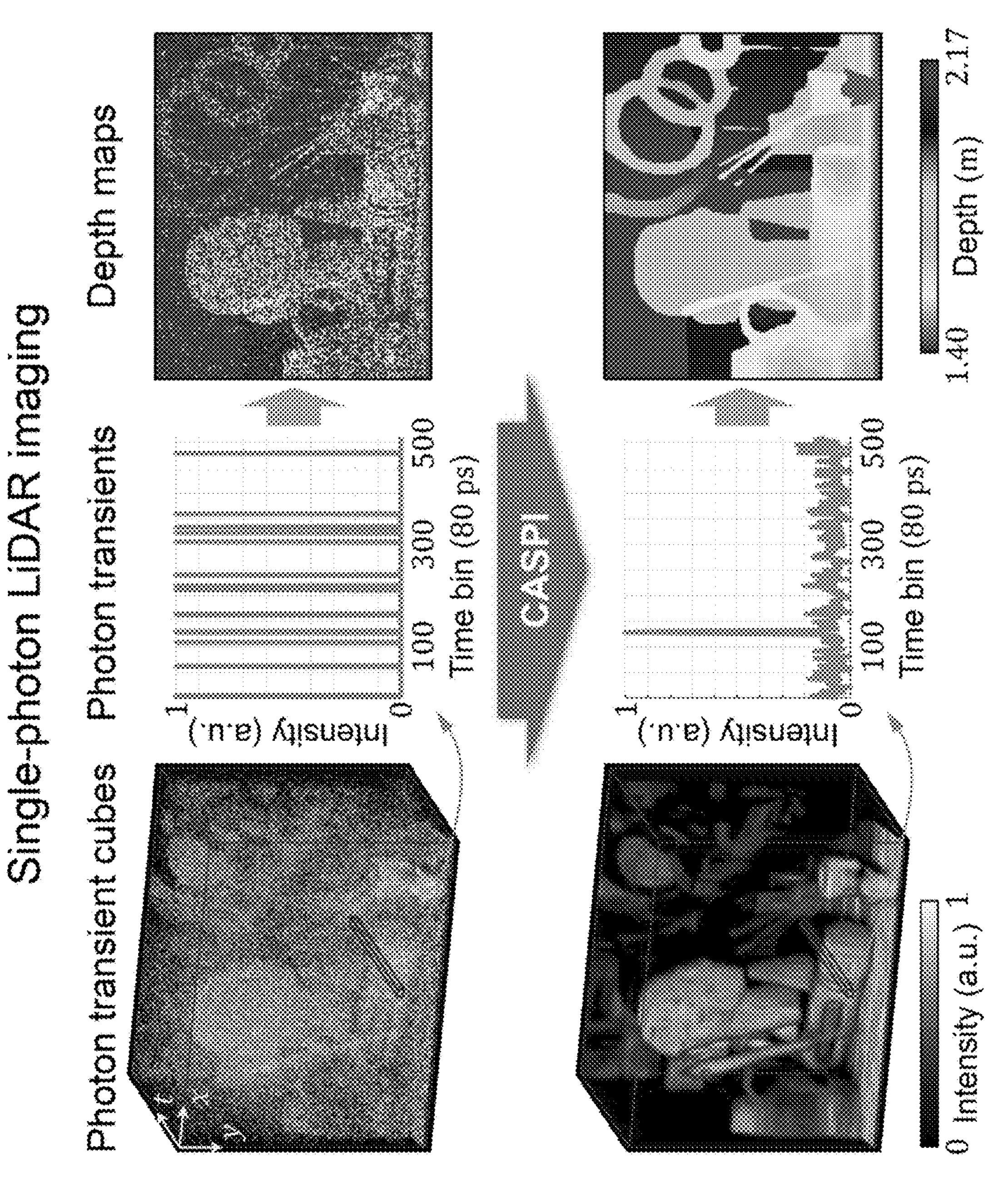
FIG. 1B shows an example of a raw photon transient cube generated using a light detection and ranging (LiDAR) device, a raw photon transient generated by a single-photon detector of the LiDAR for a portion of a scene represented by the raw photon transient cube, and a depth map of the scene generated using raw photon transients from the raw photon transient cube, and a corresponding processed photon transient cube and photon transient generated from the raw photon transient cube data using techniques described herein, and a depth map generated from the processed photon transient cube.

FIG. 1B shows an example of a raw photon transient cube generated using a light detection and ranging (LiDAR) device, a raw photon transient generated by a single-photon detector of the LiDAR for a portion of a scene represented by the raw photon transient cube, and a depth map of the scene generated using raw photon transients from the raw photon transient cube, and a corresponding processed photon transient cube and photon transient generated from the raw photon transient cube data using techniques described herein, and a depth map generated from the processed photon transient cube.

Figure 1C:
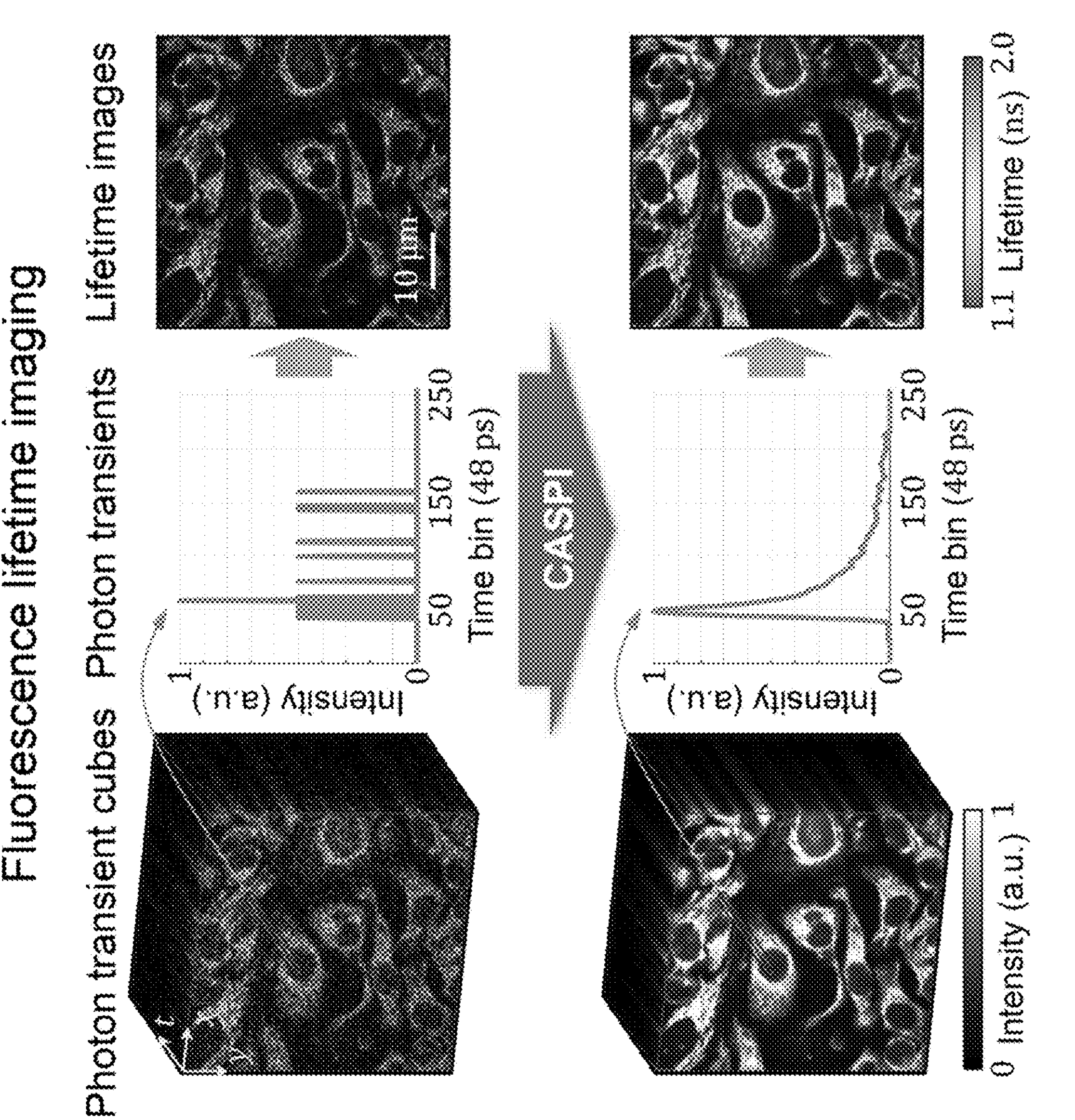
FIG. 1C shows an example of a raw photon transient cube generated using a fluorescence lifetime imaging microscopy (FLIM) device, a raw photon transient generated by a single-photon detector of the FLIM device for a portion of a scene represented by the raw photon transient cube, and a depth map of the scene generated using raw photon transients from the raw photon transient cube, and a corresponding processed photon transient cube and photon transient generated from the raw photon transient cube data using techniques described herein, and a depth map generated from the processed photon transient cube.

FIG. 1C shows an example of a raw photon transient cube generated using a fluorescence lifetime imaging microscopy (FLIM) device, a raw photon transient generated by a single-photon detector of the FLIM device for a portion of a scene represented by the raw photon transient cube, and a depth map of the scene generated using raw photon transients from the raw photon transient cube, and a corresponding processed photon transient cube and photon transient generated from the raw photon transient cube data using techniques described herein, and a depth map generated from the processed photon transient cube.

As shown in the example of FIG. 1A, in an active imaging system, a camera can operate in synchronization with a controllable light source (e.g., a laser) to probe various scene properties such as fluorescence lifetimes or 3D depths. A single-photon camera-based active imaging system can operate reliably over a limited range of photon flux levels (e.g., labeled “favorable” in FIG. 1A). For example, in low signal conditions (e.g., photon-starved), an SPC can suffer from strong noise due to poor signal-to-noise ratio. As another example, in high illumination conditions, an SPC can suffer from severely distorted measurements, resulting in large errors in estimated depths and lifetimes. As shown in the example of FIGS. 1B and 1C, mechanisms described herein (e.g., CASPI) can be used to implement versatile photon processing techniques that enable reliable scene property estimation in extreme lighting conditions for a wide range of applications including, such as 3D scene recovery (as shown in FIG. 1B) and FLIM (as shown in FIG. 1C).

In some embodiments, time-varying photon flux incident on each pixel of an SPC can be characterized using a histogram of photon counts as a function of detection times. Such a histogram is sometimes referred to herein as a 1D photon transient or photon transient. Examples of ground-truth photon flux and measured photon transients for single-photon LiDAR are shown in FIG. 1B. By raster-scanning or flood-illuminating the scene with a pulsed laser source and using an array of single-photon detectors, a SPC can generate a 3D photon transient cube, in which various scene property estimates such as depth maps or fluorescence lifetime images can be obtained (e.g., as shown in FIGS. 1B and 1C).

As shown in FIG. 1A, despite high time resolution, SPCs can operate reliably over a narrow range of incident flux levels, and outside of that range can be expected to produce photon transients with low signal-to-noise ratio. For example, if there are very few photons (e.g., in a photon-starved regime), SPC pixels suffer from unreliable estimates due to poor signal-to-noise ratios (SNRs). As another example, if there are too many photons (e.g., in a photon-flooded regime), the measured photon transients suffer from severe non-linear distortions, which are sometimes referred to as pileup. Although pileup can be mitigated computationally (e.g., using Coates' correction), such correction can sometimes worsen the noise (e.g., as shown in FIG. 1A). Many mission-critical active imaging applications in the real world encounter an extremely wide dynamic range of photon flux levels. For example, a single-photon flash LiDAR system that illuminates the entire field-of-view needs to recover 3D geometry with very few signal photons, often buried under bright sunlight. Although SPCs based on single photon avalanche diodes (SPADs) are rapidly becoming commercially available, the lack of a robust and versatile photon data processing pipeline limits the wider deployment of this exciting new technology.

Conventional image and video processing algorithms are not designed for binary photon data, and thus fail to recover photon transient cubes under extreme illumination conditions. This is because sparse binary photon counts under photon-starved regimes make it challenging to find spatio-temporal correlations (both local and non-local), a basic building block of several conventional image processing techniques. Applying conventional filtering after scene property estimation is inadequate since the noise is extreme, and does not follow conventional noise models. Modern deep-learning-based approaches often do not generalize well for out-of-distribution settings, making practical deployment for mission-critical applications such as biomedical imaging challenging. Although numerous state-of-the-art approaches have shown varying degrees of success for specific applications over a narrow set of operating conditions, unifying techniques towards realizing a general-purpose photon processing unit for SPCs, akin to image processing units (IPUs) in conventional CMOS cameras remains elusive.

In some embodiments, photon data processing techniques described herein can facilitate reliable scene property estimation over a wide range of operating conditions while requiring no training and remaining agnostic to the application in which it is being used. As described below in connection with FIGS. 8 to 17B, simulations and real experiments were carried out for two popular applications of SPCs (single-photon LiDAR and FLIM) that demonstrate performance of some described techniques. Robust depth estimation is shown in sub-photon regimes (e.g., <1 signal photons per pixel) and under strong background illumination (e.g., >200×higher ambient photons than signal photons). Another example shows a 5 times improvement in fluorescence lifetime estimation accuracy over state-of-the-art techniques with as few as 10 photons per pixel (generally such estimation requires 100 photons per pixel for mono-exponential decays), facilitating live-cell autofluorescence imaging in extremely photon-starved regimes.

Figures 2A, 2B:
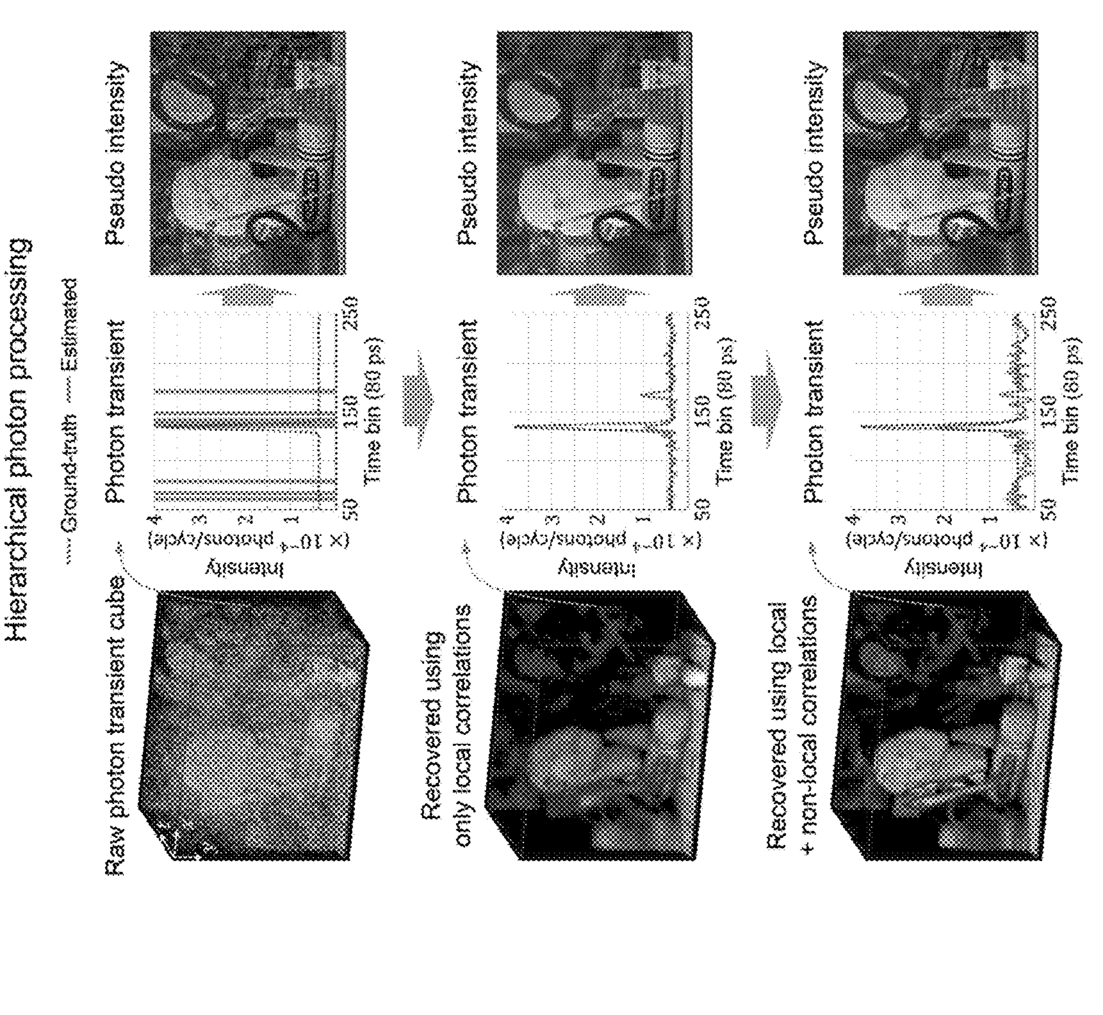
FIG. 2A shows examples of Fourier transforms of different hierarchical subsets of a photon transient cube.
FIG. 2B shows an example of hierarchical photon processing in accordance with some embodiments of the disclosed subject matter.

FIG. 2A shows examples of Fourier transforms of different hierarchical subsets of a photon transient cube.

FIG. 2B shows an example of hierarchical photon processing in accordance with some embodiments of the disclosed subject matter.

As shown in FIG. 2A, when stronger correlations are available in photon data, noise can be effectively suppressed relative to the signal in the Fourier domain, leading to better signal and noise separation by accurate noise estimation. Note that the Fourier transforms of the 3D and 4D transients are flattened to the time/bin dimension.

It is challenging to use non-local correlations directly in extreme illumination conditions due to severe noise. In some embodiments, techniques described herein can utilize a hierarchical approach, which can facilitate identification of non-local correlations from photon data captured in extreme illumination conditions. In some embodiments, mechanisms described herein can estimate photon fluxes using only local correlations, use the estimated photon flux to find similar cubelets, and recover final photon fluxes by exploiting local and non-local correlations collaboratively.

In general, photon transient cubes for most natural scenes captured by high-resolution SPCs can be expected to contain abundant spatio-temporal correlations at multiple scales and dimensions, and exploiting local and nonlocal photon correlations collaboratively, relatively accurate photon fluxes can be recovered even under extreme lighting conditions. FIG. 2A shows Fourier transforms (fattened along one dimension for visualization) of different hierarchical subsets of a photon transient cube, including a 1D photon transient, a 3D photon transient cubelet, and a 4D photon transient set, which can be a set of similar 3D photon transient cubelets. As shown in FIG. 2A, when correlations increase with the dimension of the subsets, the amount of noise relative to the signal decreases. This is because any structured low frequency signal components accumulate better than random noise components in a higher dimensional Fourier transform. This phenomena becomes more prominent when not only local correlations but also non-local correlations are available (e.g., as in the 4D photon transient set), and noise can be significantly reduced.

As shown in FIG. 2B, in some embodiments, mechanisms described herein can utilize a hierarchical approach to find similar cubelets and exploit both local and non-local correlations even in the presence of strong noise and distortions. For example, initial flux estimates can be determined using only local correlations within 3D photon transient cubelets (e.g., local correlations can be correlations among data that falls within a single 3D photon transient cubelet). As shown in FIG. 2B, although non-local correlations are not exploited, the SNR of the photon transient based on the initial estimated flux is much better than in the raw photon transient. For example, the SNR can be sufficiently improved to locate similar cubelets over larger non-local neighborhoods. In some embodiments, after finding the similar cubelets, final photon fluxes can be recovered using local and non-local correlations collaboratively from a set of similar 3D cubelets or 4D photon transient set.

Figure 3A:
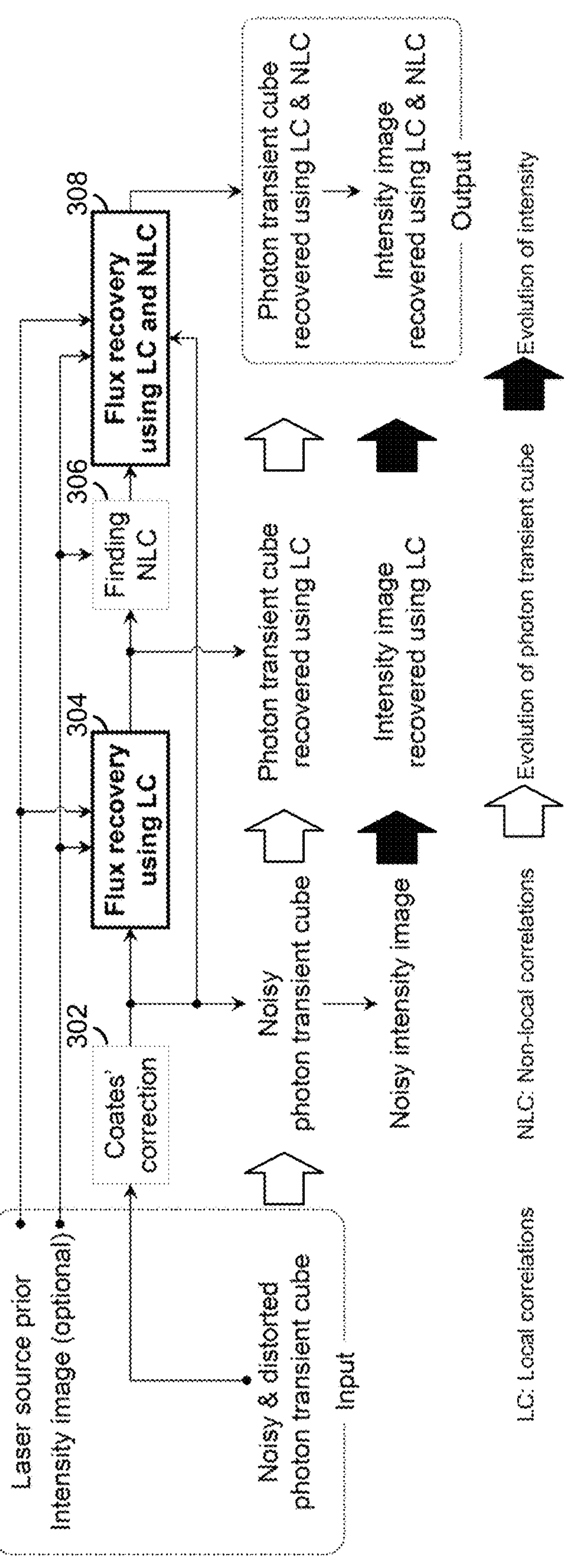
FIG. 3A shows an example of a flow for improving signal-to-noise ratio in single-photon data in accordance with some embodiments of the disclosed subject matter.

FIG. 3A shows an example 300 of a flow for improving signal-to-noise ratio in single-photon data in accordance with some embodiments of the disclosed subject matter.

Figure 5A:
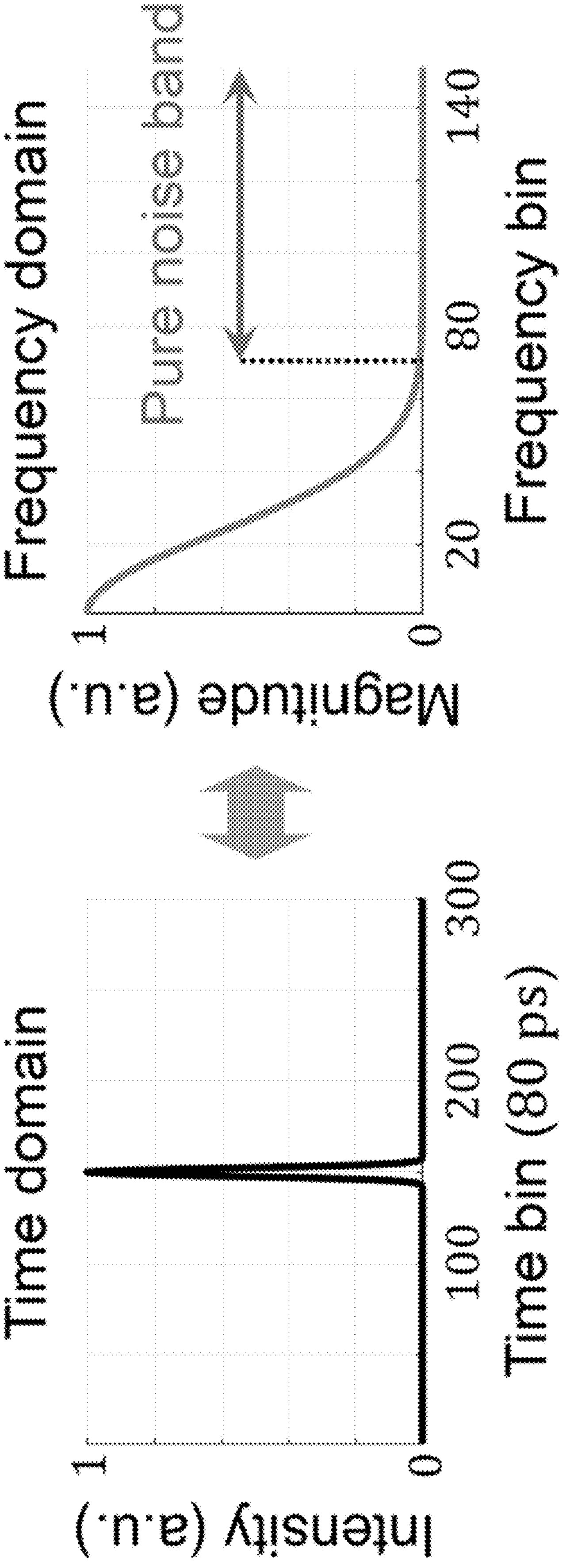
FIG. 5A shows an example of a laser profile and a pure noise band in the frequency domain for a simulated LiDAR device.
Figure 5B:
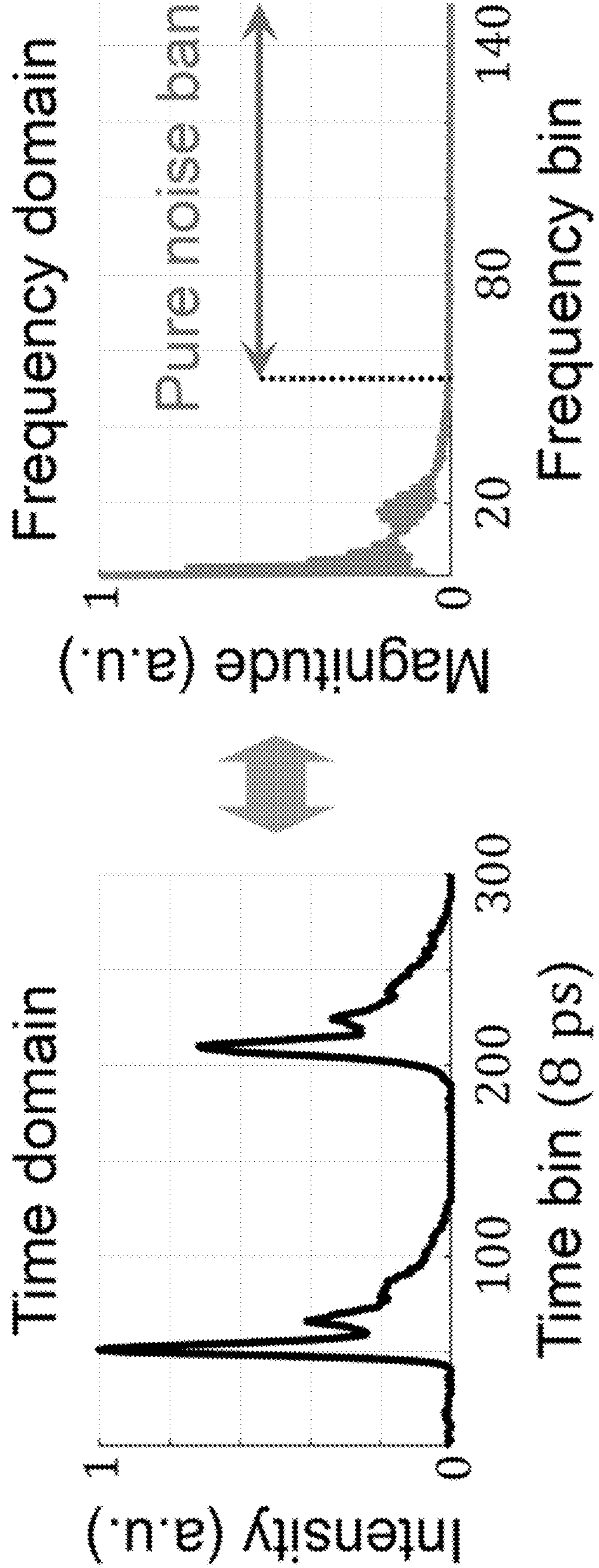
FIG. 5B shows an example of a laser profile and a pure noise band in the frequency domain for a LiDAR device used in an experimental setup used to generate experimental results.

As shown in FIG. 3A a noisy and distorted photon transient cube, laser source prior (e.g., a laser intensity over the time domain, as shown in FIGS. 5A and 5B), and, in some embodiments, a high-quality intensity image can be supplied as input. In some embodiments, pileup distortions can be reduced in the photon transient cube using Coates' correction. After such a reduction, initial photon flux estimates can be recovered using local correlations (LC), and the initial photon flux estimates can be used to find similar photon cubelets. After collecting the similar cubelets, final photon flux estimates can be recovered by exploiting local and non-local correlations (LC and NLC) collaboratively. As described below in connection with FIGS. 3B to 3D, photon fluxes can be estimated in multiple staged. The noise and initial fluxes can be recovered first, and the flux estimates can be further refined through Wiener filtering based on the estimated SNR.

As shown in FIG. 3A, a 3D photon transient cube can be generated. The raw data captured from the SPC can include a stream of photon timestamps at each pixel location. For each camera pixel, a 1D photon transient can be constructed $$(\text{e.g., } \in \mathbb{Z}_+^{N_t},$$

where $N_t$ is the number of time bins), which can be formatted as a histogram of photon counts as a function of photon detection times. Repeating this for all pixels, a 3D photon transient cube $$(\text{e.g., } \in \mathbb{Z}_+^{N_y \times N_x \times N_t},$$

where $N_y$ and $N_x$ are the numbers of rows and columns in the SPC pixel array) as shown in FIGS. 2A and 2B.

In some embodiments, at 302, Coates' correction can be applied to the 3D photon transient cube, which can reduce pileup distortion. Note that the noise of the photon transient cube can be amplified at the cost of pileup reduction (the more severe the distortion is, the higher the noise will be). This amplified noise can be removed in subsequent processing.

In some embodiments, after Coates' correction, initial photon flux estimates can be recovered at 304 using local spatiotemporal correlations. Such initial photon flux estimates can be used to locate similar cubelets more precisely, which can be used to leverage non-local correlations in the data.

In some embodiments, a 3D photon transient cubelet $$(\text{e.g., } \in \mathbb{R}_+^{C_y \times C_x \times N_t},$$

where $C_y$ and $C_x$ are the numbers of rows and columns of the cubelet, respectively) can be defined for each pixel such that the pixel is located at a particular location (e.g., the upper left front corner of the cubelet, the upper right corner, the lower left corner, the lower right corner, the center, etc.). For example, for a photon transient cube having spatial dimensions x×y (e.g., captured by an x×y array of single photon detectors, captured by scanning an x×1 or 1×y array of single photon detectors, by raster scanning one single photon detector, etc.), about x×y photon transient cubelets can be generated. For example, cubelets that overlap the boundary of the photon transient cube can be omitted. In such an example, if each cubelet is defined based on the upper left pixel, pixels that are closer to the lower boundary and/or the right boundary than the dimensions of the cubelet (e.g., $<C_y$ or $C_x$), a cubelet defined on that pixel can be omitted. As another example, cubelets that overlap the boundary of the photon transient cubelets can be padded (e.g., including a value of zero in positions that fall outside the photon transient cube, including a value of one in positions that fall outside the photon transient cube, etc.).

In some embodiments, a noise level in the cubelet can be estimated (e.g., as describe below in connection with FIG. 3C) and initial photon flux estimates can be recovered on a cubelet basis (e.g., as described below in connection with FIG. 3C). If the flux recovery on a cubelet basis is performed for all pixels of the photon transient cube, each pixel will have multiple flux estimates. The initial flux estimate for each pixel can be determined based on a weighted average of multiple flux estimates with appropriate weights (e.g., as described below in connection with FIG. 3C).

In some embodiments, after initial flux recovery using local correlations, at 306 similar cubelets can be identified, which can be used, at 308, to recover final flux estimates exploiting both local and non-local correlations. In some embodiments, at 306, to find similar cubelets relatively fast and relatively precisely. In some embodiments, the search space can be defined on the image domain instead of the photon transient cube domain. For example, if a high-quality intensity image $$\left(\text{e.g., } \in \mathbb{R}_+^{N_y \times N_x}\right)$$

is available as additional input (e.g., from a co-located imaging modality, such as a low-light passive camera sensor), the high-quality intensity image can be used to define a search space. As another example, a pseudo-intensity image can be generated by summing over the time dimension of the photon transient cube recovered using local correlations. The resolution of the pseudo-intensity image can be the same as the spatial resolution of the photon transient cube. For each pixel, a reference patch $$P_R\left(\in \mathbb{R}_+^{C_y \times C_x}\right)$$

can be defined on the pseudo-intensity image such that the pixel is located at a particular location (e.g., the upper left corner of the reference patch) which can correspond to the same location as the synchronization with the cubelet. Next, a $S_{intra} \times S_{intra}$ search window can be centered at the reference patch, and a target patch $$P_T\left(\in \mathbb{R}_+^{C_y \times C_x}\right)$$

can slide over the search window to find similar image patches. In some embodiments, a distance $d_{patch}$ between $P_R$ and $P_T$ can be defined as:

$$d_{patch}k = \|P_R - P_T\|_2^2. \quad (1)$$

In some embodiments, the set of similar image patches can include $N_{sim}$ image patches with the smallest $d_{patch}$ values. In some embodiments, any suitable number of similar patches can be used. For example, $N_{sim}$ can be any suitable value. In a more particular example, as described below, $N_{sim}$ can be set to 10. As another particular example, $N_{sim}$ can be set to a value in a range [2,100]. As still another more particular example, $N_{sim}$ can be set to a value in a range [5,50]. In some embodiments, locations of similar cubelets can be defined as the locations of the similar image patches. Additionally or alternatively, in some embodiments, the set of similar image patches can include $N_{sim}$ image patches with $d_{patch}$ values that fall within a threshold.

In some embodiments, after collecting the similar cubelets, final photon flux estimates can be generated at 308 using local and non-local correlations collaboratively. In some embodiments, flux recovery using both local and non-local correlations can follow the same process as flux recovery using only local correlations except that noise estimation and flux recovery can be performed on a 4D photon transient set $$(\in \mathbb{R}_+^{C_y \times C_x \times N_X \times N_{sim}},$$

where $N_{sim}$ is the number of similar cubelets) instead of a 3D photon transient cubelet $$\left(\in \mathbb{R}_+^{C_y \times C_x \times N_t}\right).$$

In a particular example, $C_x$=8, $C_y$=8, and $N_{sim}$=10 were used in simulations and experiments described below ($C_x$=$C_y$=4 were used for the result described below in connection with FIG. 10).

If multiple 3D photon transient cubes are available at different spatial or temporal positions, a 4D photon transient sequence $$(\in \mathbb{Z}_+^{N_y \times N_x \times N_t \times N_c},$$

where $N_c$ is the number of the cubes) can be used as the input, rather than a photon transient cube. Additionally, in some embodiments, relatively high-quality 3D intensity video $$\left(\in \mathbb{R}_+^{N_y \times N_x \times N_c}\right)$$

can be used as additional input (e.g., in lieu of an intensity image). In some embodiments, the same techniques can be used when a 4D photon transient sequence is used as when a 3D photon transient cube is used, except that the search space centered at the reference patch is a 3D volume with a dimension of $S_{intra}$×$S_{intra}$×$S_{inter}$. Values of $S_{intra}$=21 and $S_{inter}$=11 were used in simulations and experiments described below.

Figures 3B, 3C, 3D:
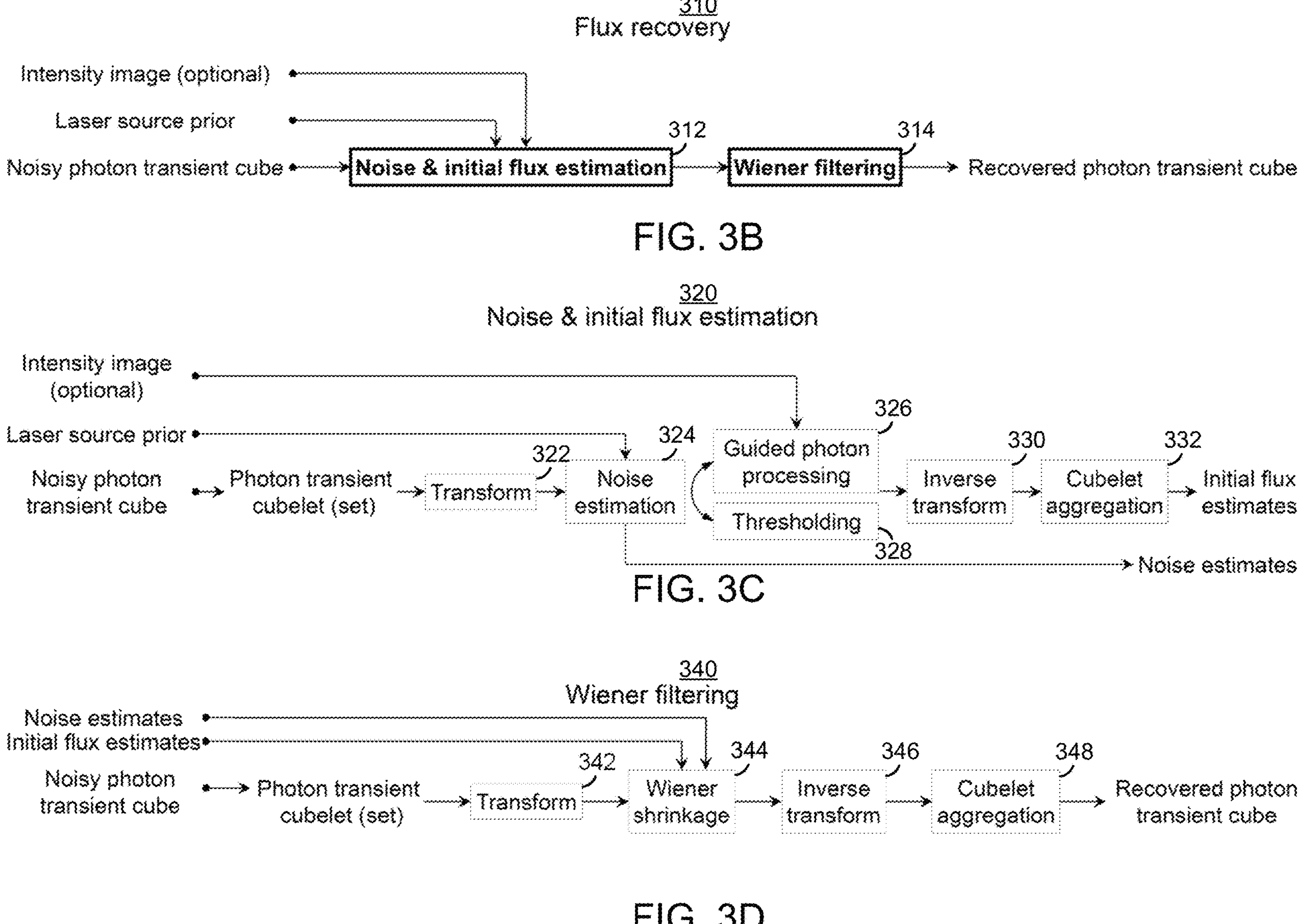
FIG. 3B shows an example of a flow for estimating flux from a noisy photon transient cube in accordance with some embodiments of the disclosed subject matter.
FIG. 3C shows an example of a flow for estimating noise an initial flux estimate from a noisy photon transient cube in accordance with some embodiments of the disclosed subject matter.
FIG. 3D shows an example of a flow for generating a photon transient cube with improved signal-to-noise ratio using a noise estimate and an initial flux estimate in accordance with some embodiments of the disclosed subject matter.

FIG. 3B shows an example 310 of a flow for estimating flux from a noisy photon transient cube in accordance with some embodiments of the disclosed subject matter.

As shown in FIG. 3B, at 312, noise in each cubelet can be estimated, and a flux estimate can be generated based on the photon transient cube (e.g., the noisy photon transient cube, a photon transient cube generated from a first flux estimate), using any suitable technique or combination of techniques, such as techniques described below in connection with FIG. 3C.

In some embodiments, at 314, the initial flux can be filtered (e.g., using Wiener filtering) to generate refined estimate fluxes from the flux. For example, photon fluxes can be recovered with Wiener filtering which is known to be optimal in a mean-squared-error sense. SNR can be calculated based on initial flux estimation and noise estimation and Fourier coefficients can be calculated according to the computed SNR.

FIG. 3C shows an example 320 of a flow for estimating noise an initial flux estimate from a noisy photon transient cube in accordance with some embodiments of the disclosed subject matter.

In some embodiments, accurately estimating noise can facilitate recovering the relatively high accuracy photon fluxes in hierarchical processing techniques described herein. In some embodiments, techniques described herein can isolate a pure noise band on a temporal frequency dimension. The pure noise band can be defined based on various observations. For example, noise-free incident photon fluxes at the sensor cannot contain higher frequencies than the laser pulse since the optical path from the laser source to the sensor acts as a low-pass filter. As another example, the signal of interest (e.g., the laser pulse) spans a subset of the low frequencies since most hardware components of the laser source have limited bandwidth. In some embodiments, the pure noise band can be defined as the range of frequencies where the Fourier magnitude of the laser pulse is negligibly small.

In some embodiments, for Gaussian-shaped laser pulses, the pure noise band $B_{noise}$ can be defined as a band of frequencies spanning three standard deviations of the Gaussian spectrum:

$$B_{noise} = \left\{ f \,\middle|\, f > \frac{3\sqrt{2\ln 2}}{\pi\, FWHM} \right\}, \quad (2)$$

where FWHM is the full-width at half-maximum of the Gaussian pulse. In the LiDAR simulations described below, Gaussian laser pulses with FWHM of 400 picoseconds (ps) (see, e.g., FIG. 8A, rows 1-3 and FIG. 8C) and 3,400 ps (see, e.g., FIG. 8A, row 4). FIG. 5A shows the Gaussian temporal laser profile used for LiDAR simulations and its Fourier magnitude, where pure noise band can be defined.

The pure noise band can be also defined for non-Gaussian laser pulses. For example, in LiDAR experiments described below, a non-Gaussian laser pulse was used with two asymmetric peaks (see, e.g., FIG. 5B) as measured during calibration of the hardware setup used for the LiDAR experiments. Even for the non-Gaussian pulses, most of the signal energy is concentrated in the low-frequency band and the pure noise can be isolated as shown in FIG. 5B.

In some embodiments, the pure noise band for the non-Gaussian pulse used in LiDAR experiments described below was defined as all the Fourier frequency bins where the magnitude is less than 1% of the maximum:

$$B_{noise} = \{f \mid f > f_N \text{ and } |\mathcal{L}(f_N| = 0.01 \max |\mathcal{L}(f)|\}, \tag{3}$$

where $|\mathcal{L}(f)|$ is the Fourier magnitude of the instrument response function (IRF) at the frequency of f. For FLIM experiments, the pure noise band was defined similarly from the IRF of the FLIM system.

After the pure noise band is isolated, a noise threshold can be defined as a statistical upper bound of the magnitude in the pure noise band (see, e.g., FIG. 2A):

$$\delta_{noise} = \left(1 + 4\sqrt{\frac{4}{\pi} - 1}\right)\mathbb{E}[|B_{noise}|], \tag{4}$$

where $B_{noise}$ is the pure noise band and $\mathbb{E}[\cdot]$ is a mean operator (e.g., calculating the mean of the magnitudes of the Fourier coefficients). In some embodiments, the noise threshold can be used to recover photon fluxes.

In a more particular example, $\mathcal{R}$ and $\mathcal{I}$ can represent the real and imaginary parts of the Fourier coefficients inside the pure noise band of the 1D photon transient, 3D photon transient cubelet, or 4D photon transient set. According to the central limit theorem, $\mathcal{R}$ and $\mathcal{I}$ can follow a Gaussian distribution with zero mean and standard deviation $\sigma_N$: $\mathcal{R} \sim \mathcal{N}(0, \sigma_N)$ and $\mathcal{I} \sim \mathcal{N}(0, \sigma_N)$. If $\mathcal{R} \sim \mathcal{N}(0,1)$ and $\mathcal{I} \sim \mathcal{N}(0, 1)$, the noise magnitude $\mathcal{M} = \sqrt{\mathcal{R}^2 + \mathcal{I}^2} \sim \chi(2)$. $\mathcal{R}$ and $\mathcal{I}$ can be normalized using:

$$\sqrt{\left(\frac{\mathcal{R} - 0}{\sigma_N}\right)^2 + \left(\frac{\mathcal{I} - 0}{\sigma_N}\right)^2} = \frac{1}{\sigma_N}\sqrt{\mathcal{R}^2 + \mathcal{I}^2} = \frac{\mathcal{M}}{\sigma_N} \sim \chi(2). \tag{5}$$

The following relationships also hold:

$$\mathbb{E}\left[\frac{\mathcal{M}}{\sigma_N}\right] = \sqrt{2}\frac{\Gamma(3/2)}{\Gamma(1)} \tag{6}$$

and $$std\left[\frac{\mathcal{M}}{\sigma_N}\right] = \sqrt{2}\sqrt{1 - \left(\frac{\Gamma(3/2)}{\Gamma(1)}\right)^2}, \tag{7}$$

where $\mathbb{E}[\cdot]$ and std[·] are the mean and standard deviation operators, respectively. Therefore, $$\mathbb{E}[\mathcal{M}] = \sigma_N\sqrt{2}\frac{\Gamma(3/2)}{\Gamma(1)} \tag{8}$$

and $$std[\mathcal{M}] = \sigma_N\sqrt{2}\sqrt{1 - \left(\frac{\Gamma(3/2)}{\Gamma(1)}\right)^2}. \tag{9}$$

The noise threshold $\delta_{noise}$ can be defined as $\mathbb{E}[M]+4std[M]$. Then $$\frac{\delta_{noise}}{\mathbb{E}[\mathcal{M}]} = \frac{\mathbb{E}[\mathcal{M}] + 4std[\mathcal{M}]}{\mathbb{E}[\mathcal{M}]} = 1 + 4\sqrt{\left(\frac{\Gamma(1)}{\Gamma(3/2)}\right)^2 - 1} = 1 + 4\sqrt{\frac{4}{\pi} - 1}. \tag{10}$$

$$\Rightarrow \delta\text{noise} = \left(1 + 4\sqrt{\frac{4}{\pi} - 1}\right)\mathbb{E}[\mathcal{M}]. \tag{11}$$

With accurate local noise estimates, latent photon fluxes can be recovered by generalizing a filtering framework (e.g., BM3D, BM4D, and V-BM4D, for example as described in Dabov et al., "Image denoising by sparse 3-d transform-domain collaborative filtering," IEEE Transactions on Image Processing (2007), Maggioni et al., "Video denoising, deblocking, and enhancement through separable 4-d nonlocal spatiotemporal transforms," IEEE Transactions on Image Processing (2012), and Maggioni et al., "Nonlocal transform-domain filter for volumetric data denoising and reconstruction," IEEE Transactions on Image Processing (2012)) to photon transient cubes. Such techniques can produce optimal results if reliable local noise statistics are available. In some embodiments, mechanisms described herein can automatically adapt to extremely noisy operating scenarios without requiring any prior knowledge of noise statistics.

In some embodiments, at 322, each photon transient cubelet or set of photon transient cubelets (e.g., a 4D photon transient set) can be transformed using any suitable transform. For example, a Fourier transform can be used to transform each photon transient cubelet into Fourier coefficients in the frequency domain. In a more particular example, a fast Fourier transform (FFT) can be used to transform each photon transient cubelet into Fourier coefficients in the frequency domain. As another example, a suitable wavelet transform can be used.

In some embodiments, at 324, a noise estimation can be performed for each cubelet or set of cubelets using any suitable technique or combination of techniques. For example, a noise estimation can be performed using a pure noise band described above in connection with EQ. (2) or (3) and a noise threshold described above in connection with EQ. (4).

In some embodiments, at 326, guided photon processing can be carried out to recover fluxes (e.g., in extremely low signal-to-noise regimes), using any suitable technique or combination of techniques. For example, techniques described below in connection with FIG. 6 can be used at 326 to recover fluxes from a noisy cubelet.

Additionally or alternatively, in some embodiments, at 328, a noise threshold, such as the noise threshold described above in connection with EQ. (4) can be used to remove noise from the transformed photon cubelet or set of photon cubelets. For example, Fourier coefficients with a magnitude that does not exceed the noise threshold can be set to zero, as such coefficients can be considered to be corrupted by noise.

In some embodiments, flow 320 can determine whether to use guided photon processing at 326 or threshold processing at 328 based on the noise estimate at 324. For example, as described below in connection with FIG. 6, the noise estimate can be used to determine a signal-to-noise ratio (SNR). In low SNR areas (e.g., cubelets or 4D sets of cubelets with an SNR that does not exceed a threshold) guided photon processing can be used at 326, and in higher SNR areas (e.g., cubelets or 4D sets of cubelets with an SNR exceeding threshold), guided a noise threshold can be used at 328.

In some embodiments, at 330, an inverse transform can be performed on the coefficients produced by guided photon processing at 326 and/or thresholding at 328, to produce flux estimates for each pixel location in each cubelet or set of cubelets. For example, an inverse Fourier transform (e.g., an inverse FFT) can be performed using the Fourier coefficients resulting from guided photon processing and/or thresholding. A result of the inverse transform can be a cubelet of flux estimates with reduced noise corresponding to the noisy photon cubelets that were provided as inputs.

In some embodiments, at 332, information for particular pixels and time bins that are represented in multiple cubelets or sets of cubelets can be aggregated. For example, multiple initial flux estimates for each pixel can be aggregated to get a single flux estimate for each pixel and time bin using a weighted average:

$$\Phi = \frac{\sum_{i=1}^{N_l} \omega_i \tilde{\Phi}_i}{\sum_{i=1}^{N_l} \omega_i}, \tag{12}$$

where $N_l$ is the number of all overlapping cubelets on the pixel, $\tilde{\Phi}$ is the flux estimate for the pixel by the $i^{th}$ cubelet, and $\omega_i$ is the weight assigned to the $i^{th}$ cubelet as follows:

$$\omega_i = \frac{1}{\mathbb{E}\left[|B_{noise,i}|^2\right]}, \tag{13}$$

where $|B_{noise,i}|^2$ is the energy of the Fourier coefficients inside the pure noise band of the $i^{th}$ cubelet.

For example, at 322-332, initial flux estimation can be performed on a 3D photon transient cubelet basis or a 4D photon transient set basis depending on available correlations. Initial flux estimates of the photon transient cubelet (or set of cubelets) can be obtained by thresholding with the noise threshold (e.g., based on EQ. (4)) in the Fourier domain or guided photon processing. If the initial flux estimation is performed on the 4D photon transient set, all recovered 3D photon transient cubelets can be returned to their original positions. After the initial flux estimation is repeated for all pixels, multiple initial flux estimates for each pixel can be aggregated to get a single flux estimate using EQ. (12).

FIG. 3D shows an example of a flow 340 for generating a photon transient cube with improved signal-to-noise ratio using a noise estimate and an initial flux estimate in accordance with some embodiments of the disclosed subject matter.

In some embodiments, based on initial flux estimates and noise estimates of each cubelet (or set of cubelets) (e.g., generated using flow 320), Wiener filtering can be performed as shown in FIG. 3D.

In some embodiments, at 342, each photon transient cubelet or set of photon transient cubelets (e.g., a 4D photon transient set) from the noisy photon transient cube can be transformed using any suitable transform. For example, a Fourier transform can be used to transform each photon transient cubelet into Fourier coefficients in the frequency domain. In a more particular example, a fast Fourier transform (FFT) can be used to transform each photon transient cubelet into Fourier coefficients in the frequency domain. As another example, a suitable wavelet transform can be used. In some embodiments, the transform at 342 can be omitted, and the transform coefficients calculated at 322 can be used in lieu of performing a transform at 342.

In some embodiments, at 344, Wiener shrinkage can be applied in the Fourier domain using suitable Wiener coefficients, and initial noise estimates for each cubelet.

In some embodiments, the Wiener coefficients can be defined as:

$$W = \frac{|A|^2}{|A|^2 + \mathbb{E}\left[|B_{noise}|^2\right]}, \tag{14}$$

where $|A|^2$ is the energy of the Fourier coefficients of the initial flux estimates of the cubelet (or set of cubelets), and $|B_{noise}|^2$ is the energy of the Fourier coefficients from the original noisy cubelet inside the pure noise band of the cubelet (or set of cubelets). The Fourier coefficients of the noisy cubelet (set) can be attenuated by element-wise multiplication with W in the Fourier domain.

In some embodiments, at 346, an inverse transform can be performed on the coefficients produced from the filtering at 344, to produce filtered flux estimates for each pixel location in each cubelet or set of cubelets. For example, an inverse Fourier transform (e.g., an inverse FFT) can be performed using the Fourier coefficients resulting from guided photon processing and/or thresholding. A result of the inverse transform can be a cubelet of flux estimates with reduced noise corresponding to the noisy photon cubelets that were provided as inputs.

In some embodiments, at 348, the Wiener-filtered results can be aggregated using techniques described above in connection with EQS. (12) and (13) recover a final photon transient cube.

Figure 4:
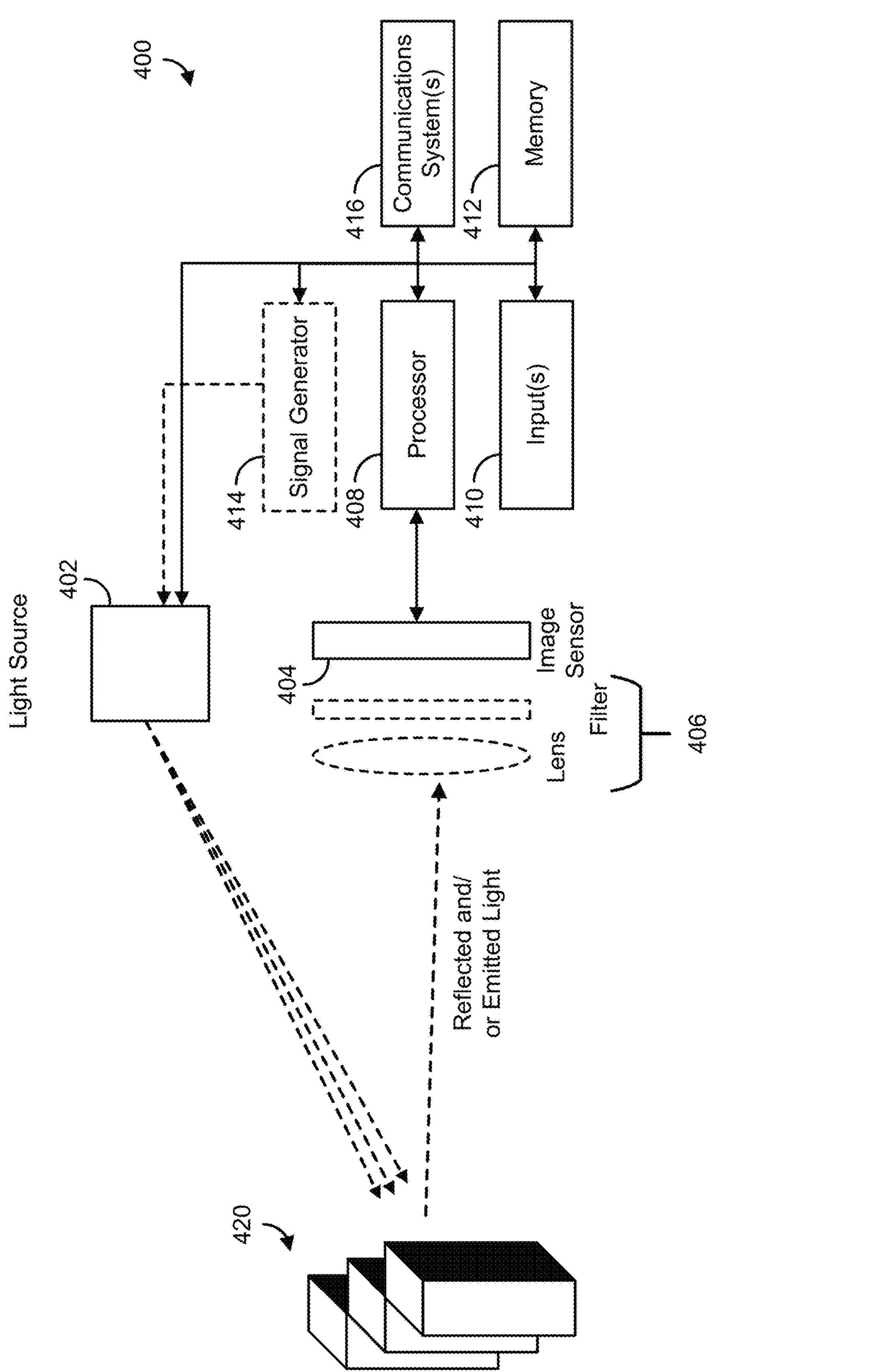
FIG. 4 shows an example of a system for generating image data from single-photon data with improved signal-to-noise ratio in accordance with some embodiments of the disclosed subject matter.

FIG. 4 shows an example 400 of a system for estimating a depth and orientation of a portion of a scene using a single-photon detector and diffuse light source in accordance with some embodiments of the disclosed subject matter. As shown in FIG. 4, system 400 can include a light source 402; an image sensor 404; optics 406 (which can include, for example, a lens, a filter, etc.); a processor 408 for controlling operations of system 400 which can include any suitable hardware processor (e.g., a central processing unit (CPU), a graphics processing unit (GPU), an accelerated processing unit (APU), a microprocessor, a digital signal processor, a microcontroller, an image processor, etc., one or more of which can be implemented using a field programmable gate array (FPGA) or an application specific integrated circuit (ASIC), or combination of hardware processors; an input device 410 (such as a shutter button, a menu button, a microphone, a touchscreen, etc.) for accepting input from a user and/or from the environment; memory 412; a signal generator 414 for generating one or more signals for driving light source 402 and/or image sensor 404; and a communication system or systems 416 for allowing communication between processor 408 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link.

In some embodiments, memory 412 can store time stamps and/or a histogram of timestamps output by image sensor 404, depth values, etc. Memory 412 can include a storage device (e.g., a hard disk, a solid state drive, a Blu-ray disc, a Digital Video Disk (DVD), random access memory (RAM), read-only memory (ROM), electronically erasable programmable read-only memory (EEPROM), etc.) for storing a computer program for controlling processor 408. In some embodiments, memory 412 can include instructions for causing processor 408 to execute processes associated with the mechanisms described herein, such as processes described below in connection with FIG. 7.

In some embodiments, light source 402 can be any suitable light source that can be configured to emit a pulse of light toward a scene 420. In some embodiments, light source 402 can be implemented using any suitable pulsed light source, such as a pulsed laser and/or light emitting diode (LED). In some embodiments, light source 402 can include an array of light sources (e.g., LEDs, laser diodes, etc.) that can be controlled (e.g., individually addressed, addressed by column, etc.) to create a pulse of light that has a relatively uniform intensity across one or more dimensions of scene 420.

In some embodiments, image sensor 404 can include one or more detectors that are capable of capturing information at a high time resolution, such as one or more single-photon detectors (e.g., SPADs), one or more avalanche photodiodes (APDs), one or more jots (e.g., as described in Fossum et al., "The quanta image sensor: Every photon Counts," Sensors, (2016)), etc. For example, image sensor 404 can include a single single-photon detector or an array of multiple single-photon detectors (e.g., SPADs, jots, photomultiplier tubes (PMTs), etc.).

In some embodiments, image sensor 404 can include on-chip processing circuitry that can be used to output a value for each frame (e.g., indicating a time at which a photon was detected, or that a photon was not detected) and/or that can be used to generate a transient on the image sensor, which can be output to processor 408, which can facilitate a reduction in the volume of data transferred from image sensor 404. For example, single-photon detectors of image sensor 404 can be associated with circuitry that implements at least a portion of process 700, described below.

In some embodiments, optics 406 can include optics (e.g., a lens) for focusing light received from scene 420, one or more bandpass filters (e.g., narrow bandpass filters) centered around the wavelength of light emitted by light source 402, one or more neutral density filters, any other suitable optics, and/or any suitable combination thereof. In some embodiments, a single filter can be used for the entire area of image sensor 404 and/or multiple filters can be used that are each associated with a smaller area of image sensor 404 (e.g., with individual pixels or groups of pixels).

In some embodiments, signal generator 414 can be one or more signal generators that can generate signals to control light source 402. As described above in connection with light source 402, in some embodiments, signal generator 414 can generate a signal that indicates when light source 402 is to be activated or not activated.

In some embodiments, system 400 can communicate with a remote device over a network using communication system(s) 416 and a communication link. Additionally or alternatively, system 400 can be included as part of another device, such as an automated system, a semi-automated system, a security system, a smartphone, a tablet computer, a laptop computer, etc. Parts of system 400 can be shared with a device within which system 400 is integrated. For example, if system 400 is integrated with an autonomous vehicle (e.g., an autonomous car) or other autonomous mobile system (e.g., a mobile robot), processor 408 can be a processor of the autonomous system and can be used to control operation of system 400.

In some embodiments, system 400 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 416 via a communication link can be carried out using any suitable computer network, or any suitable combination of networks, including the Internet, an intranet, a wide-area network (WAN), a local-area network (LAN), a wireless network (e.g., a cellular network), a digital subscriber line (DSL) network, a frame relay network, an asynchronous transfer mode (ATM) network, a virtual private network (VPN). The communications link can include any communication links suitable for communicating data between system 400 and another device, such as a network link, a wireless link, a hard-wired link, a dial-up link, any other suitable communication link, or any suitable combination of such links. System 400 and/or another device (e.g., a server, a personal computer, a smartphone, etc.) can enable a user to execute a computer program that uses information derived using the mechanisms described herein to, for example, identify one or more surfaces in a scene that can be approximated as a portion of a plane.

Note that data received through the communication link or any other communication link(s) can be received from any suitable source. In some embodiments, processor 408 can send and receive data through the communication link or any other communication link(s) using, for example, a transmitter, receiver, transmitter/receiver, transceiver, or any other suitable communication device.

FIG. 5A shows an example of a laser profile and a pure noise band in the frequency domain for a simulated LiDAR device. FIG. 5B shows an example of a laser profile and a pure noise band in the frequency domain for a LiDAR device used in an experimental setup used to generate experimental results.

Temporal laser profiles and corresponding pure noise bands for LiDAR simulations and experiments described below in connection with some of FIGS. 8A to 17B are shown in FIGS. 5A and 5B, which show Gaussian and non-Gaussian temporal laser profiles used for LiDAR simulations and experiments, respectively. In both cases, the pure noise band can be defined by computing the Fourier spectral energy outside the main signal peak.

Figures 6, 8C:
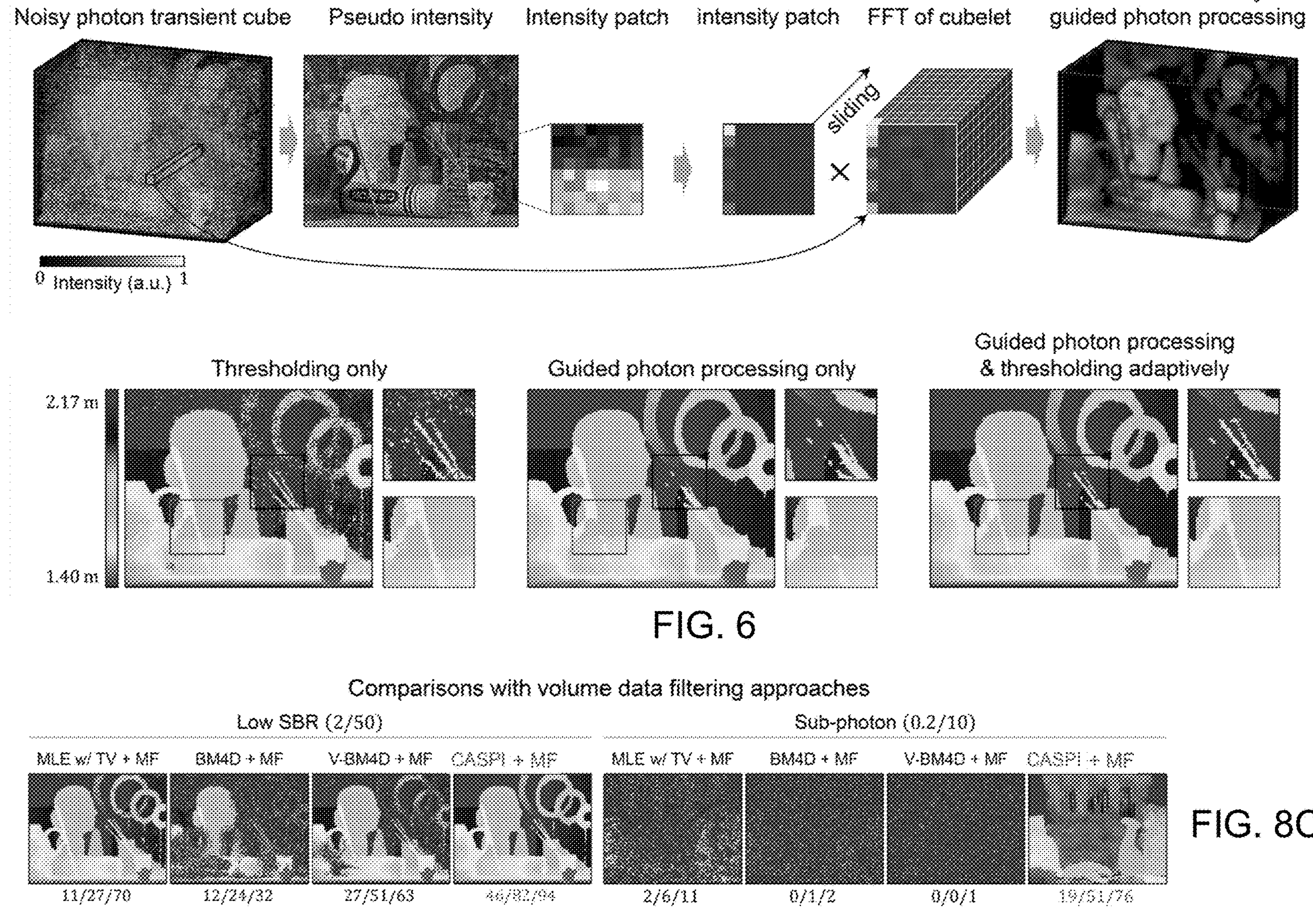
FIG. 6 shows an example of a flow for guided photon processing using a transient photon cube and an intensity image in accordance with some embodiments of the disclosed subject matter, and depth maps generated using different techniques described herein.
FIG. 8C shows a comparison of examples of depth maps generated from raw photon transients of two scenes in FIG. 8A using various techniques, including techniques implemented in accordance with some embodiments of the disclosed subject matter.

FIG. 6 shows an example of a flow for guided photon processing using a transient photon cube and an intensity image in accordance with some embodiments of the disclosed subject matter, and depth maps generated using different techniques described herein.

In some embodiments, guided photon processing can be used to recover photon fluxes in extremely low SNR scenarios (e.g., in scenes with low SNR and/or in portions of a scene with low SNR). Guided photon processing can use spatial frequency correlations between the intensity image and the photon transient cube. As shown in FIG. 6, guided photon processing and thresholding can be adaptively selected based on the estimated cubelet SNR (or the SNR of a set of cubelets) to generate initial flux estimates leading to improved depth estimates compared to using only thresholding or guided photon processing.

In extremely low SNR regimes (e.g., based on a ratio of energy in the noise band and outside the noise band), the noise component can still dominate in the transform domain notwithstanding high dimensional photon data. This can make it challenging to separate the noise and signal components even with accurate noise estimation, and initial photon fluxes cannot be estimated reliably with simple thresholding. In some embodiments, guided photon processing can be used to recover relatively accurate flux estimates in extremely low SNR regimes. In some embodiments, guided photon processing can use spatial-frequency correlations between a 2D intensity (e.g., from a pseudo-intensity generated from the noisy photon transient, or from an intensity image generated using another imaging modality) and the 3D photon transient cube to recover the photon fluxes under extremely low SNR scenarios. In general, a 2D pseudo-intensity image obtained by summing over the temporal dimension of the 3D photon transient cube can be expected to share a similar spatial distribution of Fourier magnitude as the 3D photon transient cube, but has significantly higher SNR due to temporal averaging.

Given a noisy photon transient cubelet $$\left(\in \mathbb{R}_+^{C_y \times C_x \times N_t}\right),$$

a pseudo-intensity patch $$\left(\in \mathbb{R}_+^{C_y \times C_x}\right)$$

can be formed by summing over the time dimension. If a high-quality intensity image is available as an alternative input from another imaging modality, it can be used in lieu of the pseudo-intensity information. Each pseudo-intensity patch can be normalized such that the sum of the pixel values is 1. Let $P(\in \mathbb{C}^{C_y \times C_x})$ and $C(\in \mathbb{C}^{C_y \times C_x \times N_t})$ be the Fourier coefficients of the normalized pseudo-intensity patch and the noisy cubelet, respectively. In some embodiments, a representation $P'$ $(\in \mathbb{C}^{C_y \times C_x \times N_t})$ of P over the same dimension as the cubelet can be generated by stacking P along the third dimension $N_t$ times. In some embodiments, guided photon processing can be performed in the Fourier domain by element-wise multiplication of P' and C as shown in FIG. 6.

In some embodiments, guided photon processing and thresholding have pros and cons in initial flux estimation. Although Guided photon processing reduces noise more effectively than thresholding in extremely low SNR regimes, it can remove signal details as well. Thresholding can be expected to preserve signal details better than guided photon processing in high SNR regimes. Thus, in some embodiments, mechanisms described herein can select between thresholding and guided photon processing adaptively depending on the SNR of the cubelet (or set of cubelets) to estimate initial flux estimates (e.g., as shown in FIG. 3C). The SNR of the cubelet (or set of cubelets) can be defined by:

$$R = \frac{\mathbb{E}\left[|B_{noise}^c|^2\right]}{\mathbb{E}\left[|B_{noise}|^2\right]}, \tag{15}$$

where $|B_{noise}|^2$ is the energy of the Fourier coefficients inside the pure noise band, $$|B_{noise}^c|^2$$

is the energy outside the pure noise band and $\mathbb{E}[\cdot]$ is the mean operator. In some embodiments. thresholding can be selected if $R>R_{th}$, and guided photon processing is selected otherwise. For example, $$R_{th} = \frac{1}{0.8}$$

can be used for flux recovery using local correlations, and $$R_{th} = \frac{1}{0.9}$$

can be used for flux recovery using local and non-local correlations.

Figure 7:
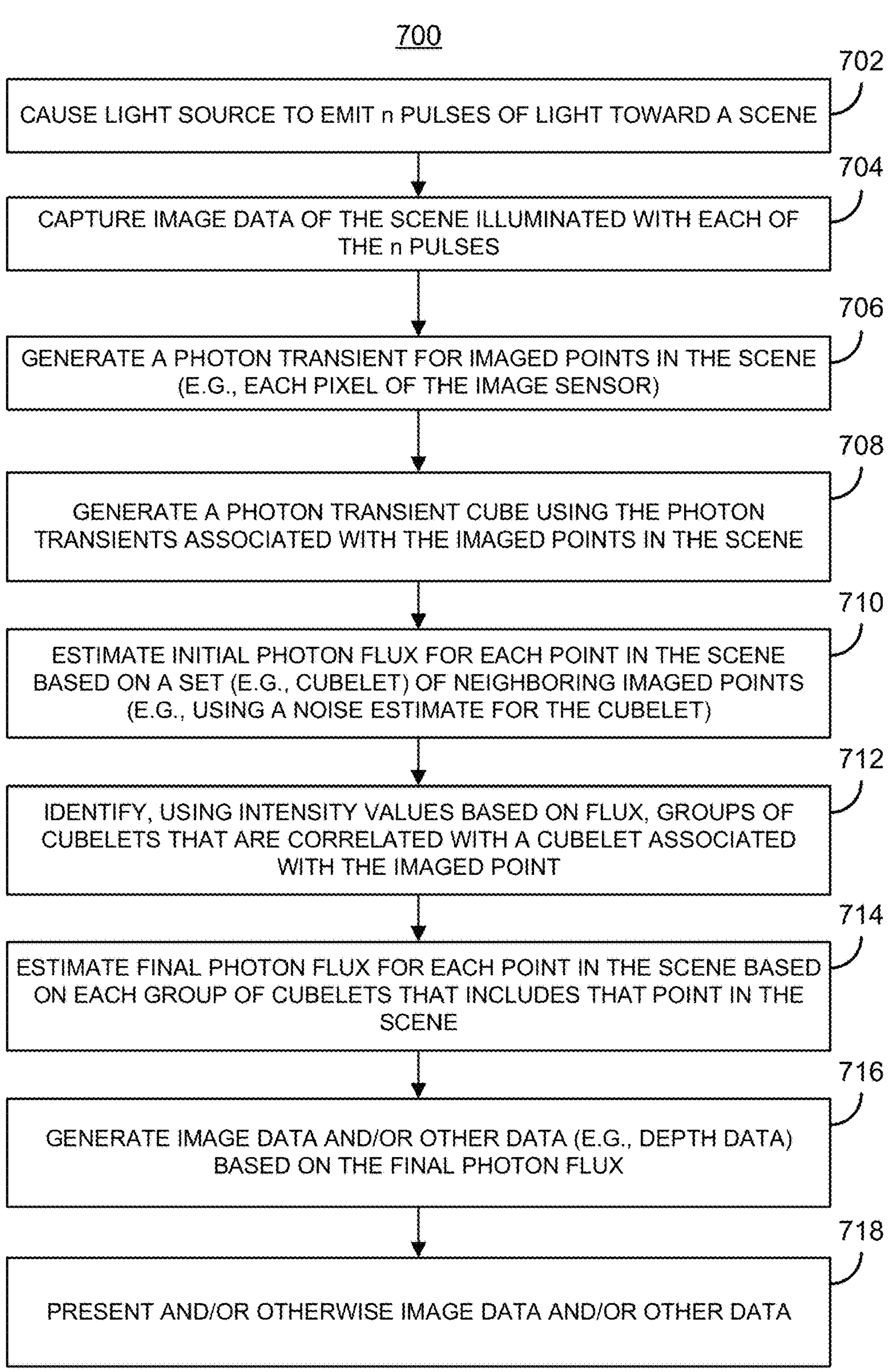
FIG. 7 shows an example of a process for generating single-photon data with improved signal-to-noise ratio in accordance with some embodiments of the disclosed subject matter.

FIG. 7 shows an example 700 of a process for generating single-photon data with improved signal-to-noise ratio in accordance with some embodiments of the disclosed subject matter.

At 702, process 700 can cause a light source(s) (e.g., light source 402) to emit a series of light pulses (e.g., N light pulses) toward a scene. In some embodiments, process 5700 can use any suitable technique or combination or techniques to cause the light source(s) to emit the series of light pulses toward the scene. For example, process 700 can utilize a signal generator (e.g., signal generator 414) to periodically (e.g., at regular and/or irregular intervals) cause the light source to emit a pulse of light.

At 704, process 700 can capture image data of the scene illuminated with each of the light pulses emitted at 702. In some embodiments, process 700 can use any suitable technique or combination of techniques to capture image data of the scene. For example, process 700 can capture a histogram based on timestamps output by one or more single photon imaging pixels (e.g., implemented using a SPAD, implemented using a jot, using a photomultiplier tube, etc.) using synchronous techniques (e.g., using regular time intervals between laser pulses) or asynchronous techniques (e.g., using techniques described in U.S. Pat. No. 11,448,767, which is hereby incorporated by reference herein in its entirety). As another example, process 700 can capture a histogram based on outputs from a high speed ADC configured to generate a brightness value based on an input analog signal received from an avalanche photo diode (APD), as described above. In such an example, fewer pulses (e.g., as few as one pulses) can be used to capture a histogram.

At 706, process 700 can generate a photon transient for each pixel using any suitable technique or combination of techniques. For example, for SPAD-based implementations, process 700 can generate the transient histogram from a SPAD histogram. In a more particular example, in a SPAD-based implementation and a scene with relatively low ambient brightness, the transient histogram can be the SPAD histogram. In such an example, 706 can be omitted. As another more particular example, in a SPAD-based implementation and a scene with relatively high ambient brightness, the transient histogram can generate the transient histogram using techniques to correct for pileup, such as using an asynchronous acquisition scheme, using a Coates correction to estimate the transient histogram, etc. In some embodiments, process 700 can include (e.g., prior to causing the light source to emit the N pulses at 702) determining an ambient brightness, and can determine whether to use a synchronous or asynchronous acquisition scheme, an attenuation level (e.g., as described in connection with FIG. 10 of U.S. Pat. No. 11,448,767, which has been incorporated herein by reference).

At 708, process 700 can generate a photon transient cube using the photon transients associated with the imaged points in the scene. For example, process 700 can aggregate the photon transients generated at 706 into a 3D photon transient cube that includes a photon transient for each pixel of a scene (e.g., corresponding to a particular single-photon detector in an array of single-photon detectors and/or a particular portion of a scene from which data was captured using a particular single-photon detector scanned over the scene).

At 710, process 700 can estimate, for each pixel, an initial photon flux for each point in the scene and for each time bin in the photon transient cube based on local correlations (e.g., based on a cubelet of neighboring pixels) using any suitable technique or combination of techniques. For example, process 700 can use techniques described above in connection with 304 of FIG. 3A to estimate an initial photon flux for each point in the scene.

At 712, process 700 can identify, using intensity values based on the initial flux estimates (e.g., based on a pseudo-intensity image generated from the initial flux values) groups of cubelets (e.g., a 4D set of cubelets) that are correlated with a cubelet defined for each pixel using any suitable technique or combination of techniques. For example, techniques described above in connection with 306 of FIG. 3A can be used to identify groups of similar cubelets.

At 714, process 700 can estimate, for each pixel, a final photon flux for each point in the scene and for each time bin in the photon transient cube based on local correlations (e.g., based on a cubelet of neighboring pixels) using any suitable technique or combination of techniques. For example, process 700 can use techniques described above in connection with 308 of FIG. 3A to estimate a final photon flux for each point in the scene.

At 716, process 700 can generate image data and/or other data based on the final photon flux estimates for each point in the scene. For example, in some embodiments, process 700 can generate a 3D image and/or a depth map based on the final photon flux estimates for each point in the scene (e.g., from data generated by a LiDAR system or a 3D camera). As another example, process 700 can generate lifetime images based on the final photon flux estimates for each point in the scene (e.g., from data generated in a FLIM system).

At 718, process 700 can present (or cause to be presented) the image data and/or other data generated at 716 and/or can output the data (e.g., to another system). For example, process 700 can utilize a display to present the data. As another example, process 700 can output the data (e.g., to another system), and the data can be used in any suitable application (e.g., for object detection, 3D scene mapping, etc.).

Figure 8A:
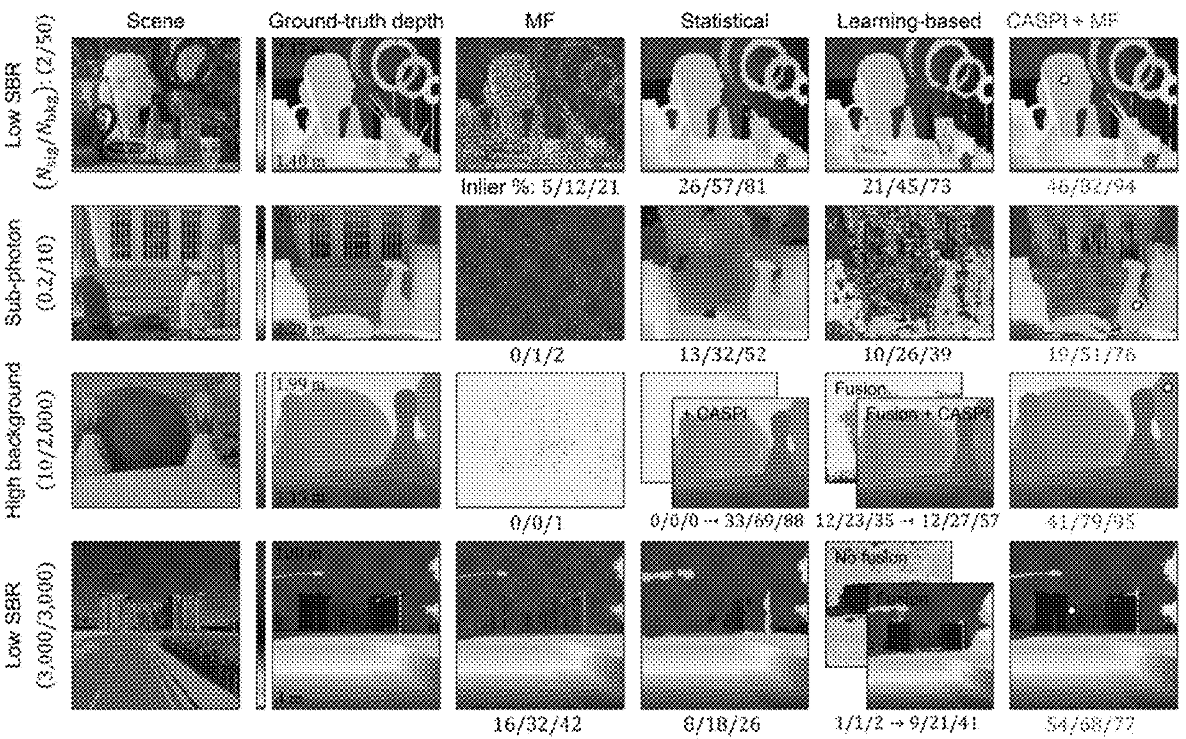
FIG. 8A shows examples of various scenes and depth maps generated from single-photon data using various techniques, including techniques implemented in accordance with some embodiments of the disclosed subject matter.

FIG. 8A shows examples of various scenes and depth maps generated from single-photon data using various techniques, including techniques implemented in accordance with some embodiments of the disclosed subject matter.

Figure 8B:
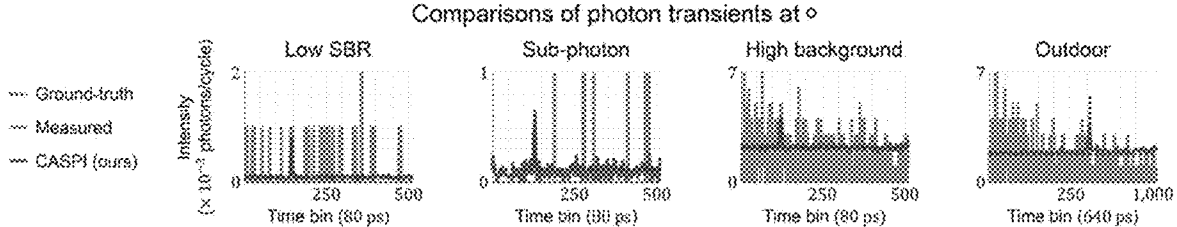
FIG. 8B shows examples of raw photon transients from the scenes shown in FIG. 8A.

FIG. 8B shows examples of raw photon transients from the scenes shown in FIG. 8A.

FIG. 8C shows a comparison of examples of depth maps generated from raw photon transients of two scenes in FIG. 8A using various techniques, including techniques implemented in accordance with some embodiments of the disclosed subject matter.

In the following examples showing results from simulated and experimental data, SPAD histograms for LiDAR simulations were built using the following techniques. The lighting condition is given by ($N_{sig}$/$N_{bkg}$), where $N_{sig}$ and $N_{bkg}$ are the average incident signal and background photon counts per pixel during the total laser cycles, respectively. The mean signal photon counts incident at pixel p in each cycle is given by:

$$\overline{N_{sig}}(p) = \frac{N_{sig}}{N_{cycle}} \frac{I(p)}{D^2(p)} \mathbb{E}\left[\frac{D^2}{I}\right], \tag{16}$$

where $N_{cycle}$ is the total number of laser cycles, I(p) is ground-truth intensity at p, D(p) is ground-truth depth at p, and $$\mathbb{E}\left[\frac{D^2}{I}\right]$$

is the mean of pixel-wise division of the depth map squared by the intensity image. The mean background photon counts incident at p per cycle per time bin is given as:

$$\overline{N_{bkg}}(p) = \frac{N_{bkg}}{N_{cycle} N_t} \frac{I(p)}{\mathbb{E}[I]}, \tag{17}$$

where $\mathbb{E}[I]$ is the mean of the intensity image. Note from EQS. (16) and (17) that both signal and background fluxes are proportional to the intensity, and only the signal fluxes are inversely proportional to the square of the depth while the background fluxes remain constant regardless of the depth.

Assuming a Gaussian laser pulse, the time-discrete version of the signal flux incident at p is given by:

$$\Phi_{sig}(p; n) = \overline{N_{sig}}(p) \mathcal{N}\left(m = \text{round}\left(\frac{2d}{c\Delta_t}\right) \sigma = \frac{FWHM}{2\sqrt{2\log 2}\,\Delta_t}\right)(n \in \{1, \ldots, N_t\}), \tag{18}$$

where $\mathcal{N}$ is the normalized time-discrete Gaussian function with mean m and standard deviation σ; d is the depth; c is the speed of light, and $\Delta_t$ is the time bin size. Note that $$\sum_{n=1}^{N_t} \Phi_{sig}(p; n) = \overline{N_{sig}}(p).$$

The time-discrete version of the background flux incident at p is given by:

$$\Phi_{bkg}(p;n)=\overline{N_{bkg}}(p)(n\in\{1,N_t\}). \tag{19}$$

Thus, the time-discrete version of the total flux incident at p is given by:

$$\Phi(p;n)=\Phi_{sig}(p;n)+\Phi_{bkg}(p;n)(n\in\{1,\ldots,N_t\}). \tag{20}$$

In each laser cycle, random photon counts were generated according to Poisson statistics with Φ(p; n) as the mean, and the time bin index was recorded for the first incident photon. This was repeated over $N_{cycle}$ number of laser cycles to construct the SPAD histogram.

TABLE 1 shows the parameter values used to construct the photon transient cubes.

TABLE 1

Photon transient cube specification for LiDAR simulations.

| Scene | $(N_{sig}, N_{bkg})$ | $N_{cycle}$ | $N_x$ | $N_y$ | $N_t$ | $\Delta_t$ | $N_c$ |
|---|---|---|---|---|---|---|---|
| Art | (2/50) | 1,000 | 209 | 167 | 1,024 | 80 ps | 1 |
| Laundry | (0.2/10) | 1,000 | 202 | 167 | 1,024 | 80 ps | 1 |
| Bowling1 | (10/2,000) | 1,000 | 188 | 167 | 1,024 | 80 ps | 1 |
| Road | (3,000/3,000) | 1,000 | 200 | 200 | 1,024 | 680 ps | 20 |

The experimental LiDAR data includes two datasets captured using an asynchronous single-photon imaging technique (e.g., as described in U.S. Pat. No. 11,448,767). The datasets were obtained from a hardware prototype that included a 405 nanometer (nm) pulsed laser (Picoquant LDH-P-C-405B), a TCSPC module (Picoquant HydraHarp 400), and a fast-gated SPAD. The laser was operated at a repetition frequency of 10 megahertz (MHz) for an unambiguous depth range of 15 meters (m). Each dataset has a ground-truth photon transient cube acquired with long acquisition time without ambient light. For the "face scene," the ground-truth data was down-sampled such that the average signal photon counts per pixel are 24, 2.4, and 0.8, respectively. The "deer" scene was captured under strong ambient illumination (>20,000 lux) high enough to cause pileup distortion. See TABLE 2 for more detailed photon transient cube specifications.

TABLE 2

Photon transient cube specification for LiDAR experiments.

| Scene | $(N_{sig}, N_{bkg})$ | $N_{cycle}$ | $N_x$ | $N_y$ | $N_t$ | $\Delta_t$ | $N_c$ |
|---|---|---|---|---|---|---|---|
| Face | (24/0) | 90 | 116 | 204 | 8,192 | 8 ps | 1 |
| Face | (2.4/0) | 9 | 116 | 204 | 8,192 | 8 ps | 1 |
| Face | (0.8/0) | 3 | 116 | 204 | 8,192 | 8 ps | 1 |
| Deer | (2/320) | 30 | 154 | 174 | 8,192 | 8 ps | 1 |

FIG. 8A shows examples of LiDAR imaging-based depth maps generated using CASPI techniques described herein compared with matched filtering (e.g., described in Turin, "An introduction to matched filters," IRE Transactions on Information Theory, 1960), a statistical approach (e.g., as described in Rapp et al., "A few photons among many: Unmixing signal and noise for photon-efficient active imaging," IEEE Transactions on Computation Imaging (2017)), and a learning-based approach (e.g., as described in Lindell et al., "Single-photon 3d imaging with deep sensor fusion," ACM Trans. Graph. (2018)) in various lighting conditions by simulations with the Middlebury and CARLA datasets. The three numbers underneath each depth estimation are the percent of inlier pixels that lie within 0.2%, 0.5%, and 1% of the true depths. As shown in the third row, CASPI techniques described herein can enhance the performance of existing techniques. As shown in FIG. 8B, CASPI techniques can recover latent photon fluxes over various flux regimes and can facilitate reliable depth estimation even in extreme conditions. As shown in FIG. 8C, state-of-the-art volumetric data denoising approaches fail to recover accurate photon fluxes in challenging flux regimes, which leads to unreliable depth estimates.

FIGS. 8A to 8C demonstrate the strengths of CASPI techniques in a single-photon LiDAR application. FIG. 8A shows simulation results under a wide range of challenging lighting conditions measured in terms of the average incident signal ($N_{sig}$) and background ($N_{bkg}$) photons per pixels. Test lighting conditions include a low SBR (signal-to-background ratio) regime ($N_{sig}$: 2/$N_{bkg}$: 50), sub-signal photon regime (0.2/10), high background flux regime (10/2,000), and outdoor conditions (3,000/3,000) with high background flux and long depth range. Under each lighting condition, 3D photon transient cubes were simulated using the first photon captured in each laser cycle for realistic SPAD measurements (as described above). Static, short depth range scenes from the Middlebury dataset (e.g., described in Scharstein et al., "Learning conditional random fields for stereo," in 2007 IEEE Conference on Computer Vision and Pattern Recognition (2007)) are simulated in rows 1-3, and a long-depth-range scene with motion with the CARLA simulator (e.g., described in Dosovitskiy et al., "Carla: An open urban driving simulator," Conference on Robot Learning (2017)) is simulated in row 4. The measured photon transients are severely corrupted by noise and pileup as shown in FIG. 8B. The photon fluxes are estimated using techniques described herein and then depths were estimated through conventional matched filtering. Results generated using techniques described herein are compared with matched filtering and two state-of-the-art techniques for photon-efficient LiDAR imaging: a statistical approach (Rapp 2017) and a learning-based approach (Lindell 2018). These comparison techniques attempt to directly estimate depths without any pre-processing of the photon transient cubes. The performance metric used is the percent of inlier pixels at different error thresholds of 0.2%, 0.5%, and 1%.

The statistical approach (Rapp 2017) relies on the intuition that signal photons cluster better than the background photons in the time domain. This assumption breaks down in the sub-photon regime where it is challenging to reliably locate signal photon clusters, and in the high background flux regime where spurious background photons may appear clustered. The learning-based approach (Lindell 2018) performs well in the trained low SBR setting but fails under the non-trained extreme flux regimes. Although its performance can be improved by fusion with intensity images, it is still challenging for the learning-based approach to recover depth details in the extreme regimes (see, e.g., FIG. 8A row 4). Note that in the high background flux regimes, Coates' correction was applied to all compared approaches to mitigate pileup. The CASPI-based techniques produced the best depth accuracy under all lighting conditions by recovering the most accurate latent photon fluxes (see FIG. 8B). Note that CASPI-based techniques can be complementary to existing techniques and can enhance performance of the existing techniques by providing more accurate latent fluxes (e.g., as shown in FIG. 8A, row 3).

In FIG. 8C, CASPI-based techniques are compared with various volumetric data denoising techniques: maximum likelihood estimation with total-variation (TV) (e.g., as described in O'Toole et al., "Reconstructing transient images from single-photon sensors," in Proceedings of the IEEE Conference on Computer Vision and Pattern Recognition (2017)), BM4D for volumetric data denoising (e.g., as described in Maggioni et al., "Video denoising, deblocking, and enhancement through separable 4-d nonlocal spatiotemporal transforms"), and V-BM4D for video filtering (e.g., as described in Maggioni et al., "Nonlocal transform-domain filter for volumetric data denoising and reconstruction"). Final depth values were estimated using matched filtering. The compared approaches show some improvement in depth estimation in the low SBR regime, but struggle in the sub-photon regime due to the lack of reliable knowledge of noise statistics.

Reliable local noise statistics are required for BM4D and V-BM4D to produce optimal results. Although BM4D and V-BM4D feature an optional automatic local noise estimation procedure (e.g., as described in Maggioni et al., "Nonlocal transform-domain denoising of volumetric data with groupwise adaptive variance estimation," Computational imaging×(2012)), it frequently fails for photon transient cubes because noise is estimated from arbitrary high-frequency components that are not matched with the photon transient cubes for active imaging. Hand-tuning of noise parameters is not feasible for many active imaging scenarios, where the local SNR changes dynamically due to spatially and temporally varying illumination conditions. In contrast, CASPI-based techniques can automatically adapt to extremely noisy operating scenarios by estimating local noise accurately in the pure noise band without requiring any prior knowledge of noise statistics. CASPI-based techniques can provide higher quality flux estimates and depth estimates than the state-of-the-art BM4D/V-BM4D approaches over various illumination conditions, as shown in FIG. 8C.

Figure 9A:
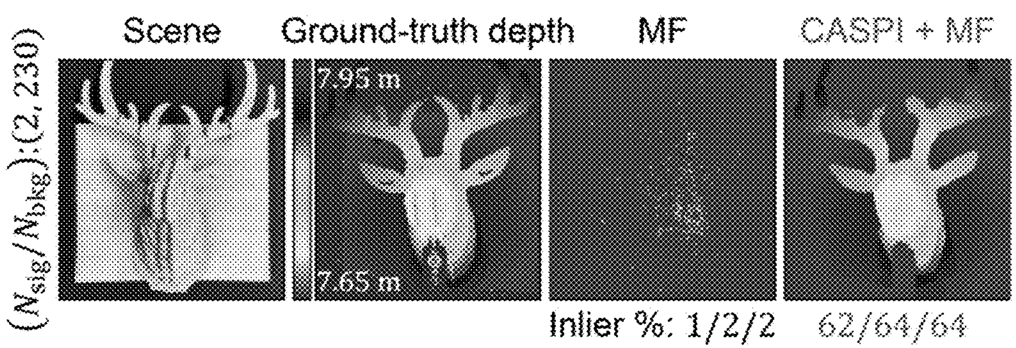
FIG. 9A shows an example of a scene with high background flux and depth maps generated from single-photon data using various techniques, including techniques implemented in accordance with some embodiments of the disclosed subject matter.

FIG. 9A shows an example of a scene with high background flux and depth maps generated from single-photon data using various techniques, including techniques implemented in accordance with some embodiments of the disclosed subject matter.

Figure 9B:
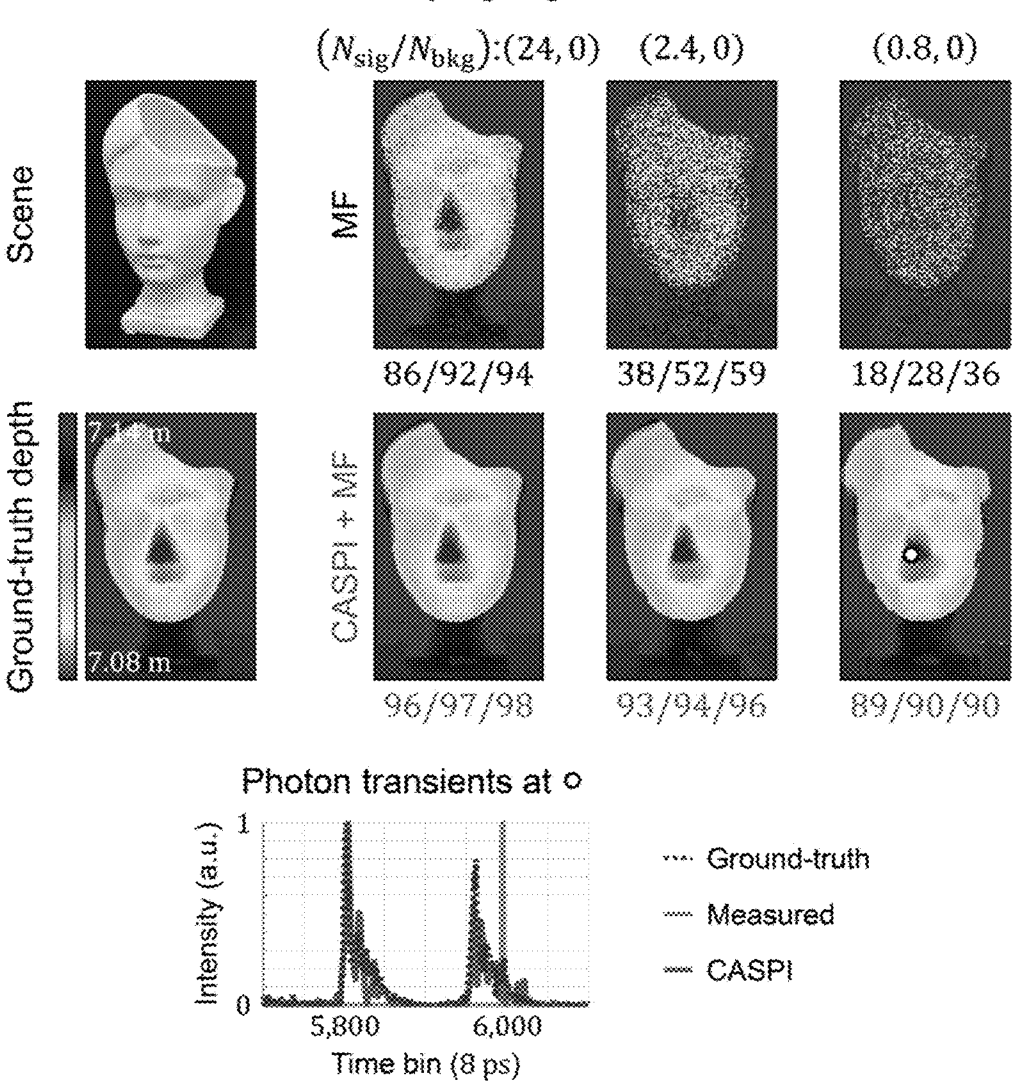
FIG. 9B shows an example of a scene with varying signal flux and depth maps generated from single-photon data using various techniques, including techniques implemented in accordance with some embodiments of the disclosed subject matter, and a raw photo transient and photo transient after processing using techniques described herein.

FIG. 9B shows an example of a scene with varying signal flux and depth maps generated from single-photon data using various techniques, including techniques implemented in accordance with some embodiments of the disclosed subject matter, and a raw photo transient and photo transient after processing using techniques described herein.

In FIGS. 9A and 9B experimental results on real-world data captured by a single-photon LiDAR hardware prototype are shown. These experiments have challenging operating conditions due to not just the lighting conditions but also a non-ideal double-peaked instrument response function (IRF) which deviates from a Gaussian IRF.

As shown in FIGS. 9A and 9B, CASPI-based techniques succeeded in recovering 3D geometry in both high background flux and sub-photon regimes where the conventional approaches fail. CASPI-based techniques are robust to non-idealities in real-world experimental datasets (e.g., non-Gaussian laser pulse shape shown in the last row of FIG. 9B). This demonstrates the practical versatility of CASPI-based techniques across a wide range of operating conditions.

As shown in FIGS. 9A and 9B, conventional approaches only work in a high signal, low background flux regime. In contrast, CASPI-based techniques recovered high resolution 3D geometry over a wider range of illumination conditions including high background flux and sub-signal photon regimes.

Figure 10A:
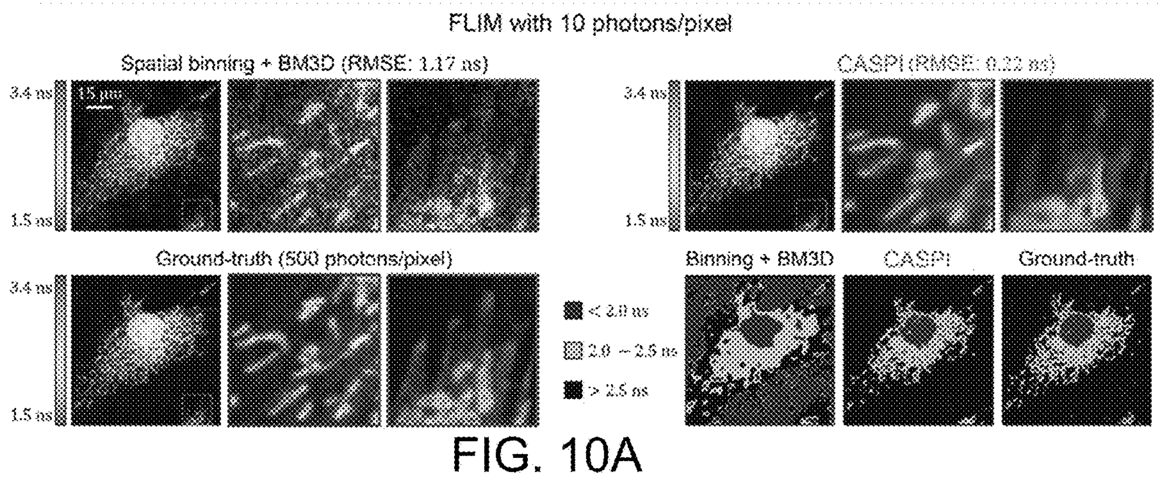
FIG. 10A shows examples of fluorescent lifetime imaging microscopy images generated using various techniques, including techniques implemented in accordance with some embodiments of the disclosed subject matter, and lifetimes measured by the different techniques.

FIG. 10A shows examples of fluorescent lifetime imaging microscopy images generated using various techniques, including techniques implemented in accordance with some embodiments of the disclosed subject matter, and lifetimes measured by the different techniques.

Figure 10B:
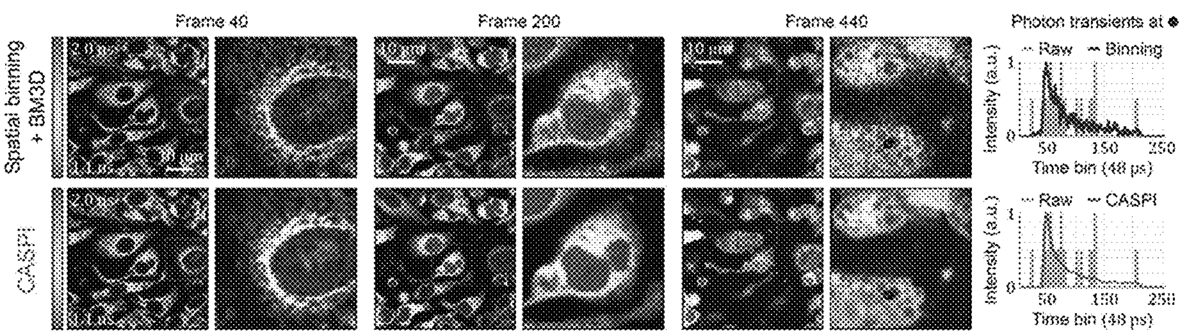
FIG. 10B shows examples of autofluorescence fluorescent lifetime imaging microscopy images generated using various techniques with maximum likelihood estimation, including techniques implemented in accordance with some embodiments of the disclosed subject matter, and raw and processed photon transients at a particular location.

FIG. 10B shows examples of autofluorescence fluorescent lifetime imaging microscopy images generated using various techniques with maximum likelihood estimation, including techniques implemented in accordance with some embodiments of the disclosed subject matter, and raw and processed photon transients at a particular location.

Figure 10C:
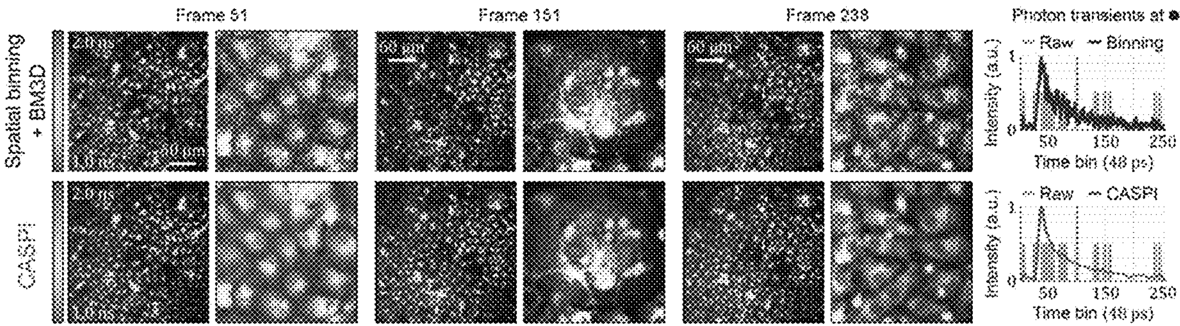
FIG. 10C shows examples of autofluorescence fluorescent lifetime imaging microscopy images generated using various techniques with linear fitting, including techniques implemented in accordance with some embodiments of the disclosed subject matter, and raw and processed photon transients at a particular location.

FIG. 10C shows examples of autofluorescence fluorescent lifetime imaging microscopy images generated using various techniques with linear fitting, including techniques implemented in accordance with some embodiments of the disclosed subject matter, and raw and processed photon transients at a particular location.

As shown in FIGS. 10A to 10C, CASPI-based techniques enable reliable lifetime estimates with as few as 10 photons per pixel and can achieve five times better performance in root-mean-square error (RMSE) compared to spatial binning of the photon transient cubes followed by BM3D applied to the lifetime estimates. The sample is fixed BPAE endothelial cells with fluorescent labels. DAPI stained nuclei and mitotracker stained mitochondrial structures are separable using CASPI even with 50 fold lesser photons. As shown in FIGS. 10B and 10C, CASPI-based techniques recovered true fluorescence emission (last column) from the low photon count datasets of autofluorescence of biological samples. With state-of-the-art fitting (FIG. 10B: maximum likelihood estimation (MLE)), or even with naïve fitting (FIG. 10C: linear fit to the log-transformed histograms), CASPI-based techniques facilitated faithful reconstruction of lifetime images by recovering structural sample details.

The effectiveness of CASPI-based techniques for FLIM with challenging low photon count datasets were also validated. Two FLIM datasets of fixed, labelled BPAE cells were collected with different acquisition times such that average photon counts per pixel are 10 and 500, respectively. The photon transient cube with 500 photons/pixel was used to get the ground-truth lifetimes. CASPI-based techniques were applied to the photon transient cube with 10 photons/pixel to recover the temporal fluorescence emission and estimate the lifetimes using maximum-likelihood estimation (MLE), one of the most widely used estimation techniques for FLIM analysis. As a comparison, the SNR of the photon transient cube with 10 photons/pixel was enhanced by 7×7 spatial binning (similar to the spatial size of the cubelet used in the CASPI-based technique) and the lifetime was estimated for each pixel using MLE. Furthermore, the BM3D (e.g., as described in Dabov 2007) to the lifetime domain to reduce the estimation error. As shown in FIG. 10A, results generated using CASPI-based techniques show substantially more reliable lifetime estimates than spatial binning+BM3D. CASPI-based techniques achieved 5 times better performance in terms of root-mean-square error (RMSE). Based on these reliable estimates, DAPI stained nuclei and mitotracker stained mitochondrial structures are separable, which is challenging with spatial binning+BM3D (see FIG. 10A). Note that spatial binning+MLE is one of the best available options from the current off-the-shelf FLIM tools.

The test was expanded to imaging living cells using their autofluorescence contrast in unlabeled live cells. The low yield of photons from intrinsic markers such as NADH and NADPH requires long collecting times. To provide a viable, long-term imaging situation, a time-lapse collection of FLIM datasets was performed on living cells under a multiphoton excitation microscope. These are temporal sequences of 3D photon transient cubes with rapid non-rigid motion. FIGS. 10B and 10C show the lifetime estimates of the epithelial cells under physiological conditions. After applying CASPI to the sequences of photon transient cubes, lifetime estimates were obtained by MLE (FIG. 10B) and by linear fitting to the log-transformed 1D photon transients (FIG. 10C). For comparison, spatial binning was applied to the sequences of photon transient cubes and BM3D to the lifetime estimates. As shown in FIGS. 10B and 10C, CASPI-based techniques recovered detailed structural characteristics of the samples by restoring the latent photon fluxes (last column), which is difficult to do with spatial binning+BM3D.

The FLIM data were acquired using two custom multiphoton microscopes. These microscopes used pulsed femtosecond lasers operating at a repetition rate $8\times10^7$ hertz (Hz) and 720 nm dichroic cut-of filter for separating fluorescence. Autofluorescence from cellular samples (NADH/NADPH) was excited at 740 nm and imaged using a bandpass emission filter centered at 457 nm with 50 nm band and an additional 680 nm short-pass filter to block the ultrafast laser. Mcherry label was excited at 740 nm, and collected using an emission filter centered at 630 nm and 69 nm emission band. The live-cell imaging was carried out using an incubator maintaining humidity, temperature, and $CO_2$ levels at physiological conditions best suited for that cell line (37° C., >90% RH and 5%). Briefly, the FLIM data were collected using time-correlated single-photon counting electronics. Using galvanometer clocks and pulsed laser sync signals, the photon arrival time was measured and single-pixel histograms were generated. The photons were collected using a photosensitive GaAsP PMT, and single-photon timings were determined on the SPC-150 timing module. To allow photon counting electronics to operate at full capacity, the detector was set to operate at a constant gain. To perform the scanning and record the single pixel histograms, two lab-developed scanning tools, OpenScan and WiscScan, were used. To increase the number of frames used in a single 3D cube, the collection time per FLIM dataset was increased in the BH-150 parameters. The laser power was maintained below 25 milliwatts (mW) for live-cell imaging. To generate additional contrast in the live cell experiments, a higher laser power was used that could induce apoptosis as shown in FIG. 10B. This power was set at 53.5 mW and all power values controlled using an electro-optic modulator. All photon transient cubes used in the FLIM experiments have the same resolution of 256×256×256, and the time bin size is 48 ps. The number of photon cubes for the time-lapse sequences of the BPAE epithelial cells (FIG. 10B), the MCF10A epithelial cells (FIG. 10C), and the Hela cells with mCherry-H2B tags (FIGS. 16A and 16B) are 493, 260 and 60, frames respectively. The 3D/Z-stack data of the cultured glioblastoma cells have 16 photon transient cubes but only 14 results are included in the paper (FIGS. 17A and 17B).

Figure 11:
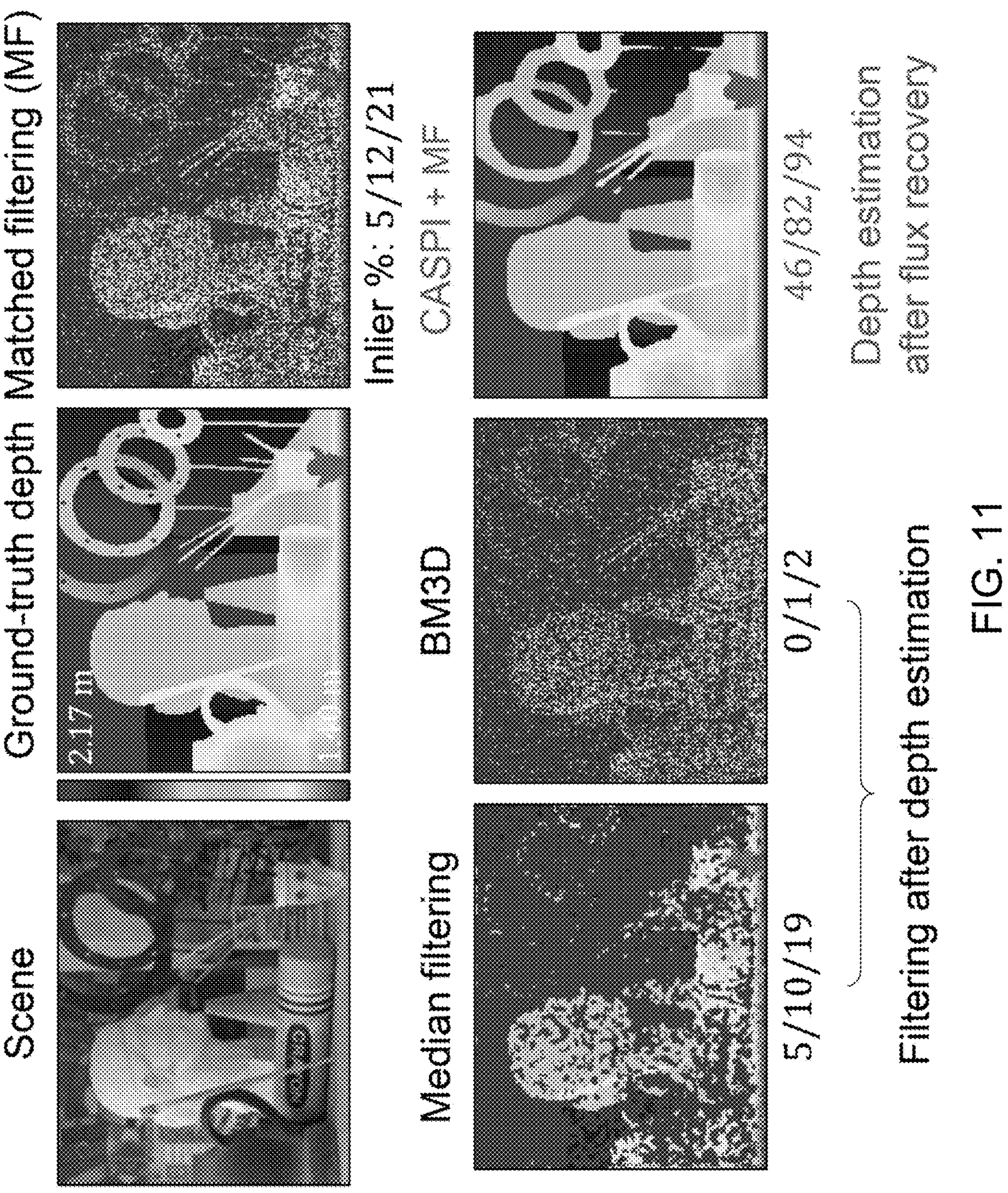
FIG. 11 shows examples of a scene and depth maps generated using various techniques with filtering before or after estimation, including techniques implemented in accordance with some embodiments of the disclosed subject matter.

FIG. 11 shows examples of a scene and depth maps generated using various techniques with filtering before or after estimation, including techniques implemented in accordance with some embodiments of the disclosed subject matter.

As shown in FIG. 11, filtering after estimation and estimation after filtering are compared. Depth estimation followed by conventional image filtering fails to get reliable depth estimates under challenging lighting conditions. After recovering the latent photon fluxes using CASPI-based techniques, reliable depth estimates can be obtained even with a simple matched filtering approach.

A comparison between conventional image filtering after depth estimation and depth estimation after using CASPI-based techniques are shown in FIG. 11. Given the noisy photon transient cube under the flux regime of ($N_{sig}$: 2/$N_{bkg}$: 50), a noisy depth map was obtained by traditional matched filtering as shown in FIG. 11. Since the noise of the estimated depth map in this challenging lighting condition does not follow commonly assumed noise models, the conventional image filtering such as median filtering (mask size: 3×3) and BM3D (noise variance=1) cannot recover reliable depth estimates as shown in FIG. 11. However, after the latent photon fluxes are recovered by CASPI-based techniques, and a high-quality depth map can be generated even with traditional matched filtering as shown in FIG. 11. This suggests that denoising early in the photon processing chain can be key to achieving high quality results.

Figure 12:
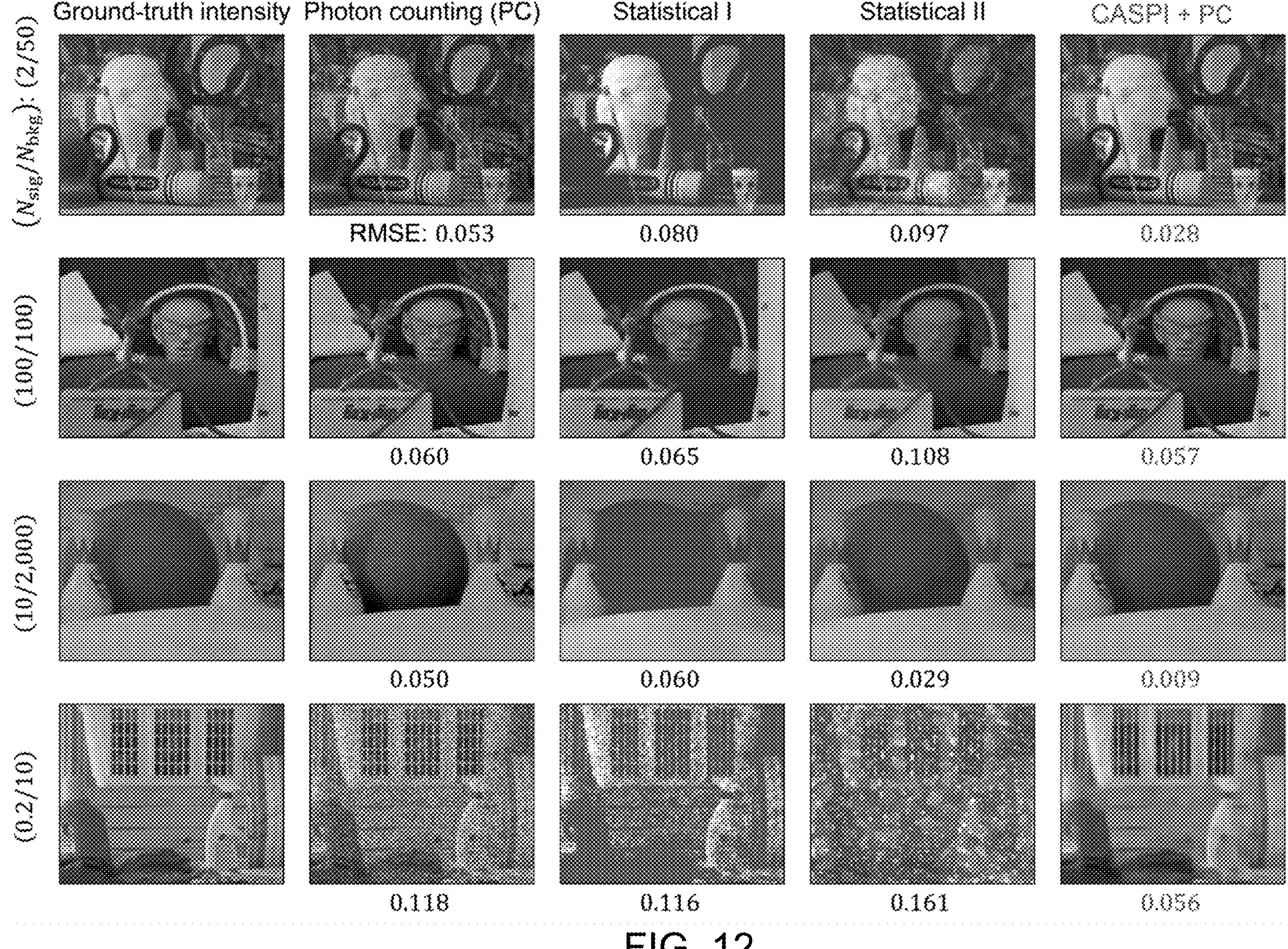
FIG. 12 shows examples of various scenes and scene intensity estimations from photon transient data using various techniques, including techniques implemented in accordance with some embodiments of the disclosed subject matter.

FIG. 12 shows examples of various scenes and scene intensity estimations from photon transient data using various techniques, including techniques implemented in accordance with some embodiments of the disclosed subject matter.

As shown in FIG. 12, CASPI-based techniques can facilitate high-quality scene intensity estimates by summing over the time dimension of the recovered photon fluxes. Compared to other approaches, CASPI-based techniques can preserve intensity details better in high signal-to-background ratio (SBR) regime ($N_{sig}$: 100/$N_{bkg}$: 100) while suppressing the noise more effectively in sub-photon regime (0.2/10). In addition, the saturation and the excessive high contrast in the photon counting result are also reduced by CASPI-based techniques when operating in a high background flux regime (10/2000). Root-mean-square error (RMSE) is labeled below each image as the objective performance measure.

FIG. 12 shows intensity estimation comparisons between different approaches under various lighting conditions with the Middlebury dataset. After recovering photon fluxes with CASPI-based techniques, intensity estimates were obtained by simply summing over the time dimension of the recovered photon fluxes. Results are compared with photon counting (PC), and two statistical approaches (statistical I described in Shin et al., "Photon-efficient computational 3-d and reflectivity imaging with single-photon detectors," IEEE Transactions on Computational Imaging (2015), and statistical II (Rapp 2017). Root-mean-square error (RMSE) is used as an objective performance measure. As shown in FIG. 12, CASPI-based techniques provide higher quality scene intensity estimates than the compared approaches over a wide range of flux regimes. For example, CASPI-based techniques preserved intensity details better than the compared approaches in high signal-to-background ratio (SBR) regime ($N_{sig}$: 100/$N_{bkg}$: 100) while suppressing the noise more effectively than the other approaches in the sub-photon regime (0.2/10). Additionally, in high background flux regime (10/2000), the saturated foreground and the excessive high contrast region of the bowling ball in the photon counting result are recovered well with our approach.

Figure 13:
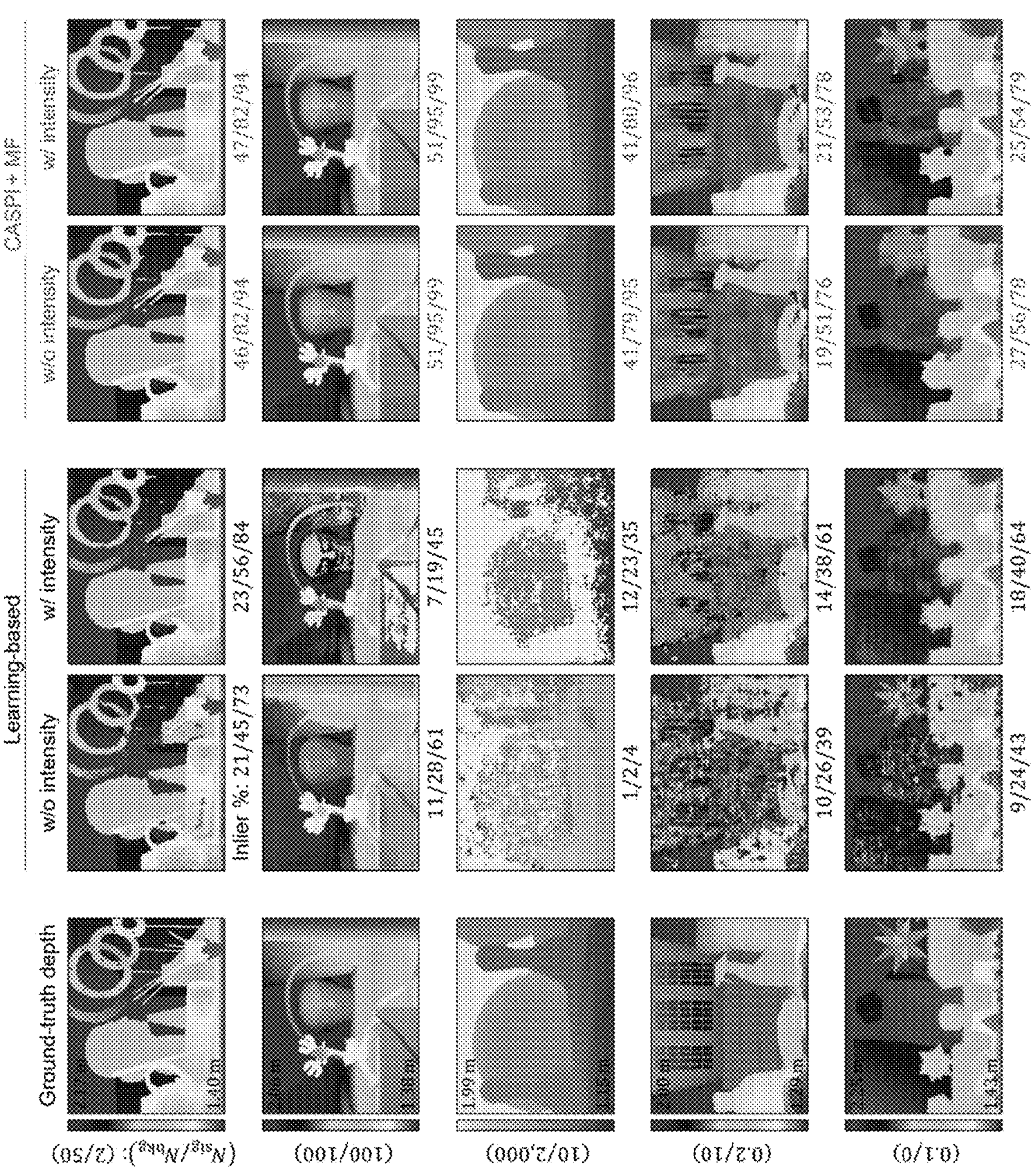
FIG. 13 shows examples of depth images generated from photon transient data using various techniques, including techniques implemented in accordance with some embodiments of the disclosed subject matter and various learning-based techniques.

FIG. 13 shows examples of depth images generated from photon transient data using various techniques, including techniques implemented in accordance with some embodiments of the disclosed subject matter and various learning-based techniques.

If high-quality intensity images are available as side input, better depth estimates can be generated using CASPI-based techniques. CASPI-based techniques are compared with a learning-based approach (Lindell 2018) which provides two types of trained models with and without the intensity images. Although intensity information improves the performance of both approaches, CASPI-based techniques without the intensity images provides better depth estimates than the learning-based approach with the intensity images under all test lighting conditions.

Although CASPI-based techniques provide reliable intensity estimates as output, high-quality intensity images can also be used as input to get better depth estimates. Additional high-quality intensity information can be beneficial for similar cubelet finding and guided photon processing in CASPI-based techniques. FIG. 13 shows depth estimation results with and without the intensity images over a wide range of lighting conditions.

Figures 14A, 14B:
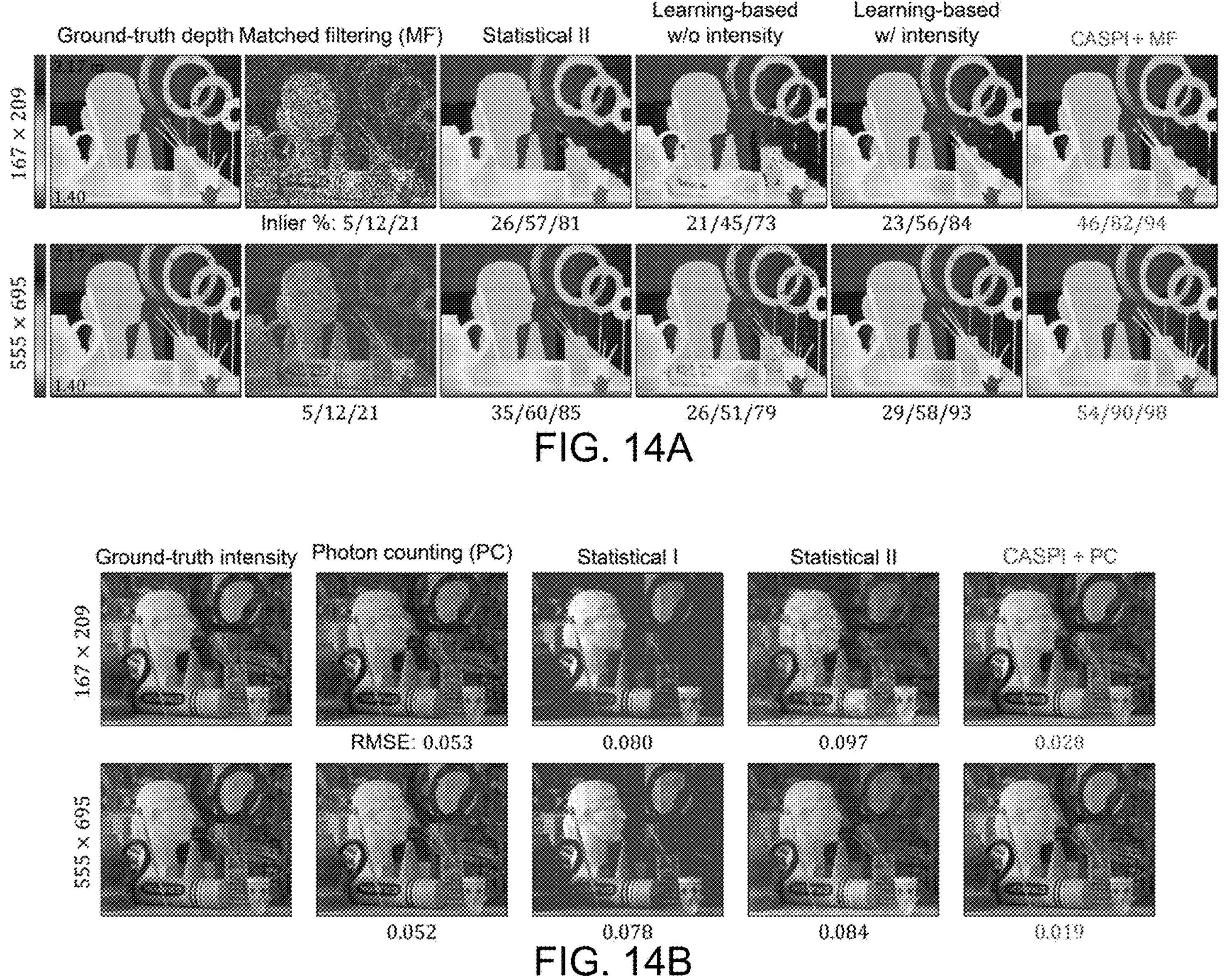
FIG. 14A shows examples depth maps generated from photon transient data using various techniques at different resolutions, including techniques implemented in accordance with some embodiments of the disclosed subject matter.
FIG. 14B shows examples of scene intensity estimations from photon transient data using various techniques at different resolutions, including techniques implemented in accordance with some embodiments of the disclosed subject matter.

FIG. 14A shows examples depth maps generated from photon transient data using various techniques at different resolutions, including techniques implemented in accordance with some embodiments of the disclosed subject matter.

FIG. 14B shows examples of scene intensity estimations from photon transient data using various techniques at different resolutions, including techniques implemented in accordance with some embodiments of the disclosed subject matter.

As shown in FIGS. 14A and 14B, intensity estimation performance increases with the spatial resolution of photon data. CASPI-based techniques show the best performance compared to other approaches in terms of both depth estimation and intensity estimation at any spatial resolution.

Depth and intensity estimation performance depends on the spatial resolution of the photon transient cube. Better estimates can be generated when the spatial resolution increases. FIG. 14A shows depth estimates by traditional matched filtering, statistical approach II (Rapp 2017), a learning-based approach (Lindell 2018), and CASPI-based techniques followed by matched filtering. FIG. 14B shows intensity estimates by photon counting, statistical approach I (Shin 2015), statistical approach II (Rapp 2017), and CASPI-based techniques followed by photon counting (summing over the time dimension of the photon transient cube). The test flux regime is ($N_{sig}$: 2/$N_{bkg}$: 50). Upper and lower rows show the results when the spatial resolution is 167×209 and 555×695, respectively. Most approaches show improved depth and intensity estimates when the spatial resolution increases. CASPI-based techniques showed the best performance compared to other approaches at any spatial resolution.

Figure 15A:
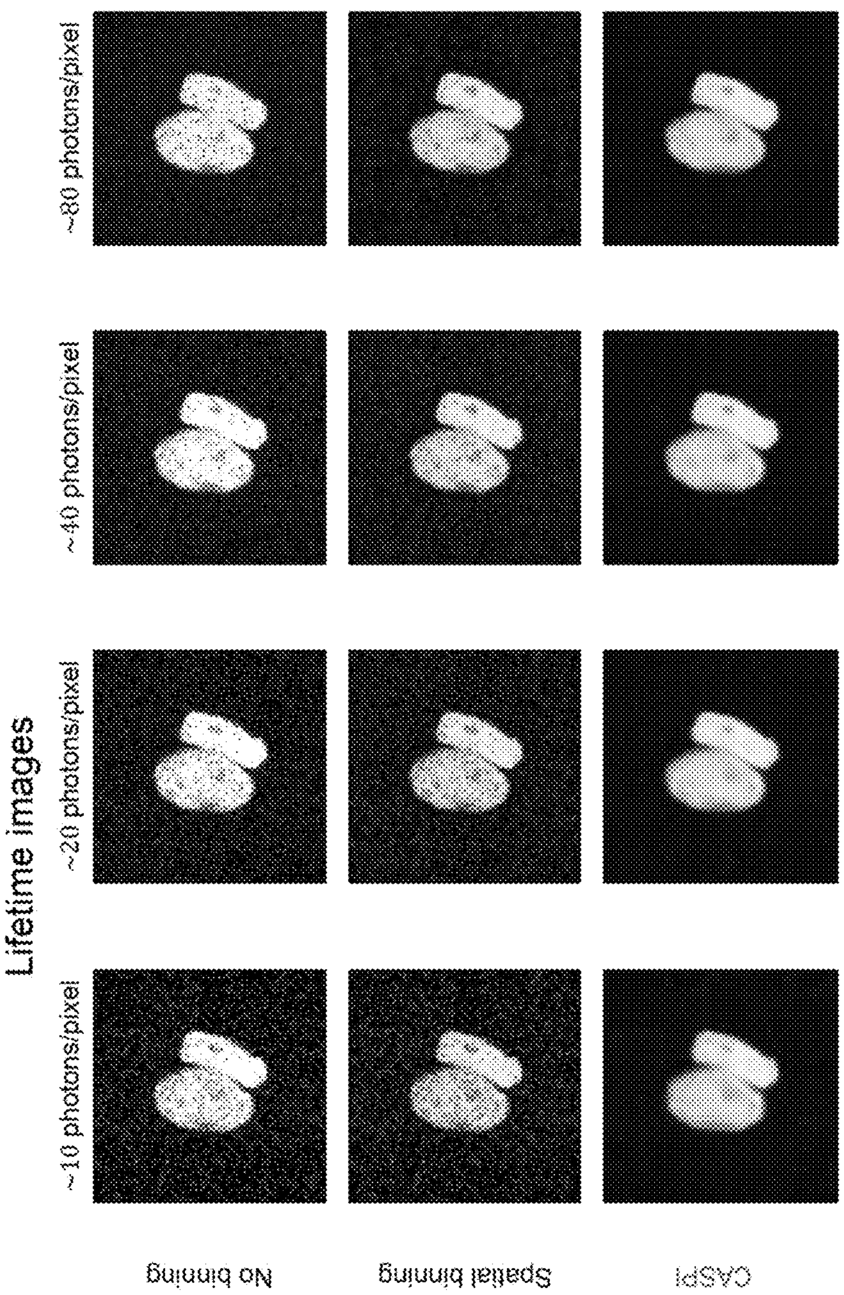
FIG. 15A shows examples of fluorescent lifetime imaging microscopy images generated from photon transient data using various techniques at different levels of photons per pixels, including techniques implemented in accordance with some embodiments of the disclosed subject matter.

FIG. 15A shows examples of fluorescent lifetime imaging microscopy images generated from photon transient data using various techniques at different levels of photons per pixels, including techniques implemented in accordance with some embodiments of the disclosed subject matter.

Figure 15B:
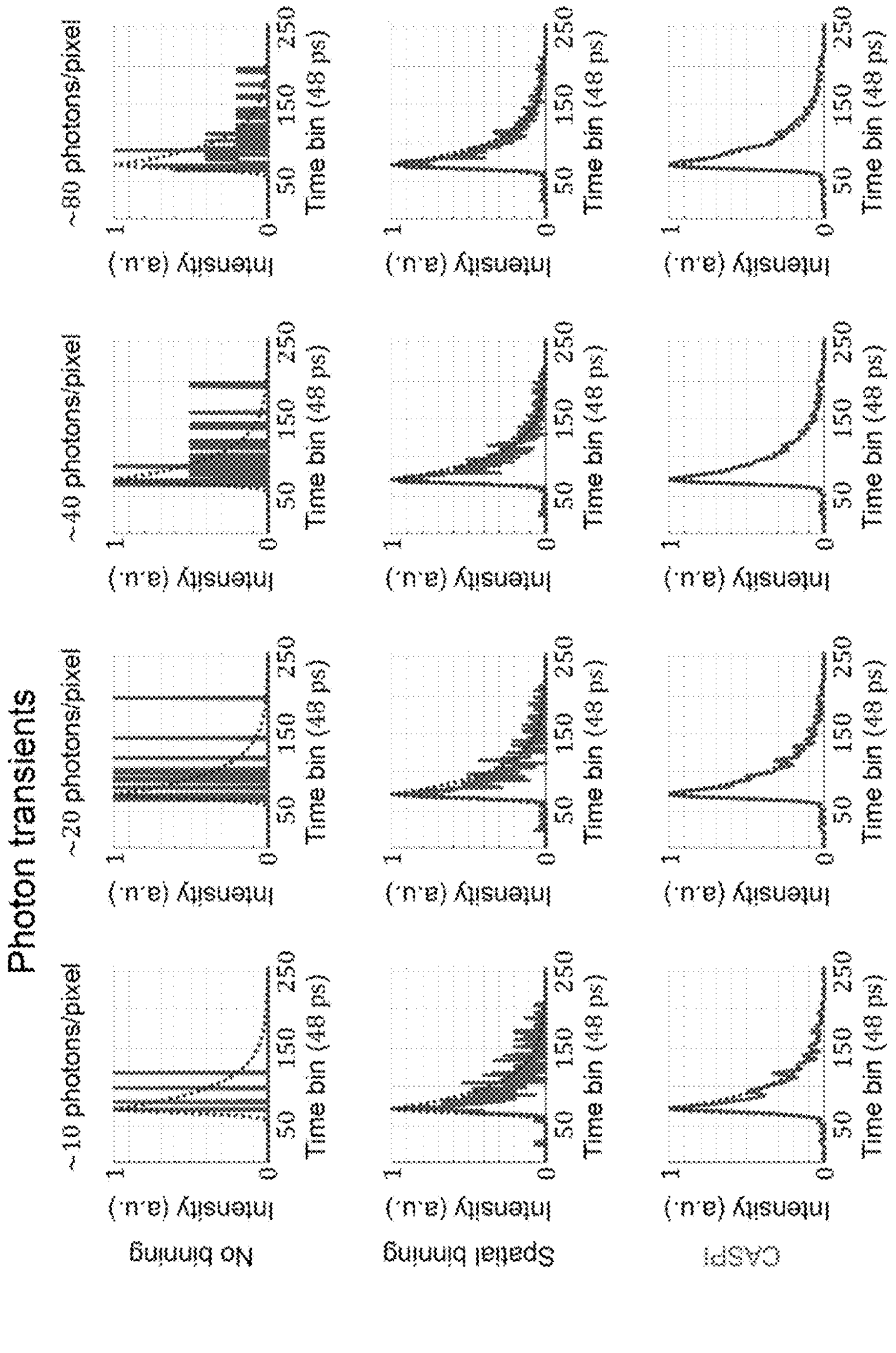
FIG. 15B shows examples of processed photon transients generated from photon transient data using various techniques at different levels of photons per pixels, including techniques implemented in accordance with some embodiments of the disclosed subject matter.

FIG. 15B shows examples of processed photon transients generated from photon transient data using various techniques at different levels of photons per pixels, including techniques implemented in accordance with some embodiments of the disclosed subject matter.

As shown in FIGS. 15A and 15B, CASPI-based techniques provide higher lifetime estimation accuracy than spatial binning even with as few as 10 photons/pixel by successfully recovering the temporal fluorescence emission.

In order to study controlled photon-starved conditions, live cells were imaged expressing mCherry-H2B fluorescent tags. With a photon count rate of 100 photons/sec/frame, multiple data sets with different photon counts were obtained by accumulating for different periods of time. The average photon counts per pixel of these photon transient cubes are about 10, 20, 40, 80, and 2,500 as shown in FIG. 15A. The photon transient cube with 2,500 photons/pixel is used as ground-truth data. Each cube is processed in three different ways for comparisons: no processing (raw data), 7×7 spatial binning (the binning size is comparable to the spatial size of the photon cubelet of our approach), and using CASPI-based techniques. The lifetimes were fitted using MLE in the SPCImage. FIG. 15A shows the lifetime images estimated from these three processed photon cubes with different photon counts. The CASPI-based techniques facilitated estimation of reliable lifetime images by recovering accurate photon fluxes even with small photon counts (as low as 10 photons/pixel) as shown in FIG. 15B.

Figure 16A:
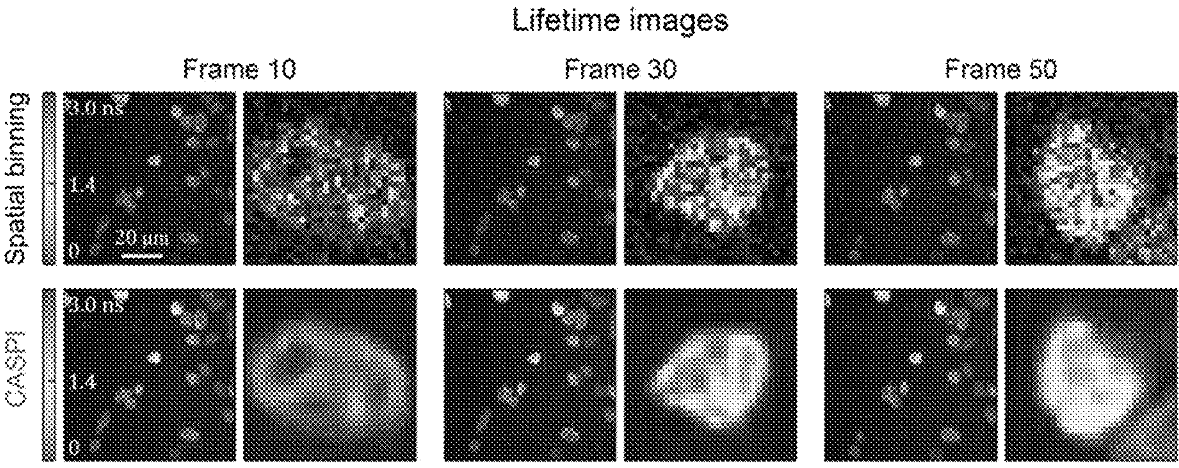
FIG. 16A shows examples of fluorescent lifetime imaging microscopy images generated from photon transient data using various techniques in a low signal-to-noise ratio, including techniques implemented in accordance with some embodiments of the disclosed subject matter.
Figure 17B:
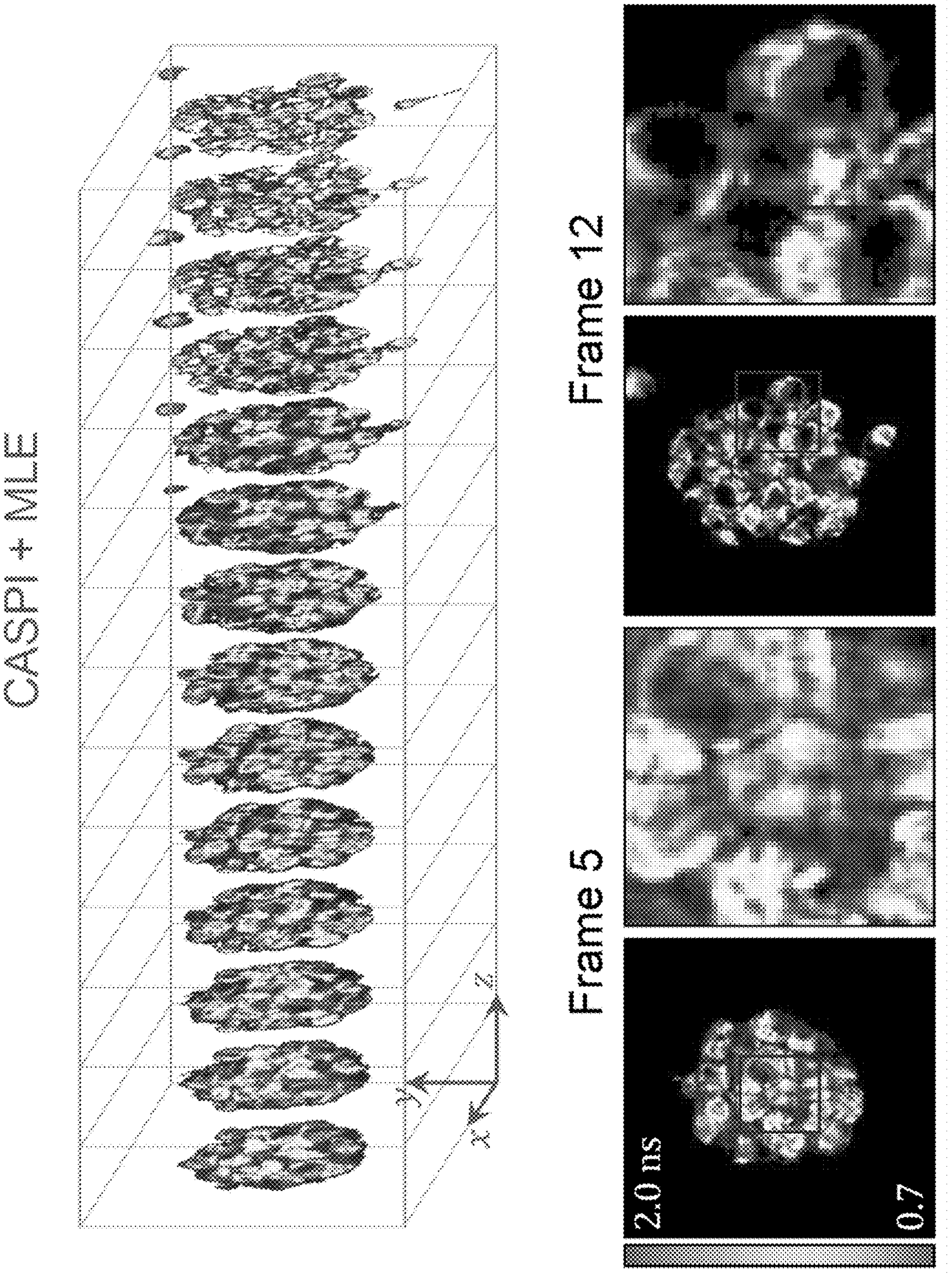
FIG. 17B shows examples of spatial sequences of fluorescent lifetime imaging microscopy images and individual frames generated from photon transient data using techniques implemented in accordance with some embodiments of the disclosed subject matter.

FIG. 16A shows examples of fluorescent lifetime imaging microscopy images generated from photon transient data using various techniques in a low signal-to-noise ratio, including techniques implemented in accordance with some embodiments of the disclosed subject matter.

Figure 16B:
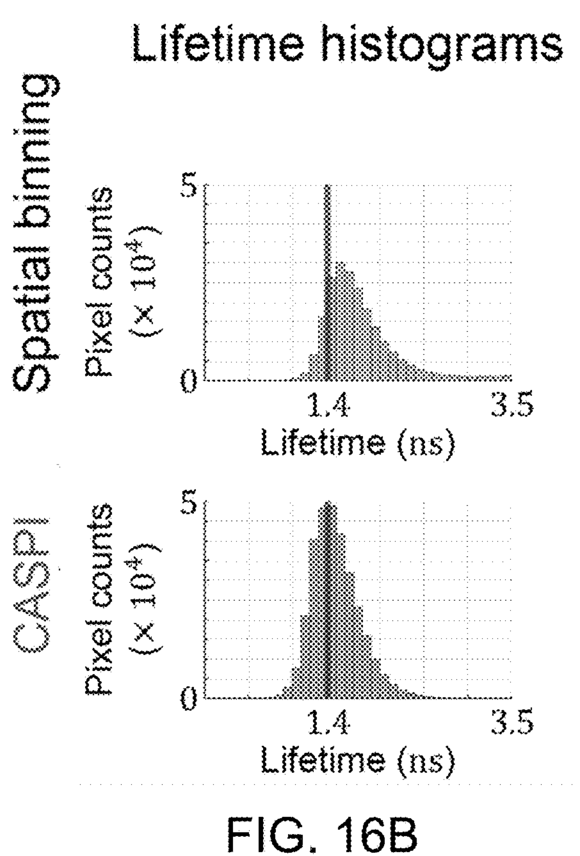
FIG. 16B shows examples of processed lifetime histograms generated using the techniques, including techniques implemented in accordance with some embodiments of the disclosed subject matter.

FIG. 16B shows examples of processed lifetime histograms generated using the techniques, including techniques implemented in accordance with some embodiments of the disclosed subject matter.

As shown in FIGS. 16A and 16B, the fluorescence emission measurements of the MCherry stained cell nuclei which has a known lifetime of 1.4 ns were captured in low SNR illumination conditions. The photon measurements were processed with 7×7 spatial binning and CASPI-based techniques and the lifetime estimates were compared in terms of lifetime images and lifetime histograms. Using CASPI-based techniques, more accurate lifetimes can be estimated for a greater number of pixels in the image.

The accuracy of lifetime estimation was also tested with CASPI-based techniques in low SNR scenarios. A time-lapse sequence of photon transient cubes of mCherry-H2B tags in HeLa cells were captured. MCherry has a known fluorescence lifetime of 1.4 ns. The photon measurements were processed with both 7×7 spatial binning and CASPI-based techniques and the lifetime estimation results are compared in FIGS. 16A and 16B, which show the comparisons in terms of the estimated lifetime images and the estimated lifetime histograms. Using CASPI-based techniques, lifetime estimates were obtained for more pixels, and the estimated lifetimes are better clustered around 1.4 ns, which is the ground-truth value.

FIG. 17A shows examples of spatial sequences of fluorescent lifetime imaging microscopy images and individual frames generated from photon transient data using a spatial binning technique and maximum likelihood estimate, including techniques implemented in accordance with some embodiments of the disclosed subject matter.

FIG. 17B shows examples of spatial sequences of fluorescent lifetime imaging microscopy images and individual frames generated from photon transient data using techniques implemented in accordance with some embodiments of the disclosed subject matter.

As shown in FIGS. 17A and 17B, which show FLIM results with spatial sequence of photon data, CASPI-based techniques can be applied to not only the temporal sequence of the photon transient cubes but also the spatial sequence such as the Z-stack, where non-local correlations can also be exploited to recover photon fluxes. The improved morphological details without noise can help to make 3D FLIM acquisition faster and avoid laser-induced photobleaching.

The 3D/Z-stack data of plated cellular pellets were obtained using their intrinsic autofluorescence. Non-local correlations between the cubes at different spatial positions can be exploited to recover the latent photon fluxes by our approach. The photon measurements were processed with 7×7 spatial binning and using CASPI-based techniques, and FIGS. 17A and 17B compare the lifetime estimation results.

FURTHER EXAMPLES HAVING A VARIETY OF FEATURES

Implementation examples are described in the following numbered clauses:

1. A method for generating single-photon imaging data with improved signal-to-noise ratio, the method comprising: generating, for each of a plurality of pixel locations, initial photon flux estimates based on a first set of photon transients including a photon transient associated with the pixel location and photon transients associated with neighboring pixel locations, wherein each of the photon transients comprises a histogram of photon counts during a plurality of time bins at the pixel location; identifying, for a scene patch associated with each of the plurality of pixel locations, one or more similar scene patches using intensity information for each of the plurality of pixel locations; and generating, for each of the plurality of pixel locations, final photon flux estimates based on a second set of photon transients including photon transients associated with the scene patch and each of the one or more similar scene patches.
2. The method of clause 1, further comprising: causing a light source to emit a sequence of n pulses toward a scene; receiving, from a single-photon detector, information indicative of arrival times of light from the scene; generating a first photon transient corresponding to a first pixel location using the information indicative of arrival times of light from the scene; and generating a 3D photon transient cube comprising a plurality of photon transients, each of the plurality of photon transients associated with a particular pixel location.
3. The method of any one of clauses 1 or 2, further comprising generating, for each of the plurality of pixel locations, a set of photon transients including a photon transient associated with that pixel location and photon transients associated with neighboring pixel locations; calculating, for each set of photon transients, a plurality of transform coefficients; estimating, for each set of photon transients, a noise level based on a noise band and the plurality of transform coefficients calculated for that set of photon transients, wherein the noise band is based on a profile of a light source used to generate the photon transients; modifying, for each set of photon transients, at least a subset of the plurality of transform coefficients based on the noise level, thereby generating a plurality of modified transform coefficients; calculating, for each set of photon transients, an inverse transform using the plurality of modified transform coefficients associated with that set of photon transients, wherein the inverse transform produces a set of modified photon transients; generating, for each pixel location, photon flux estimates based on each modified photon transient associated with that pixel location.
4. The method of clause 3, wherein the transform is a Fourier transform, and the transform coefficients are Fourier coefficients.
5. The method of any one of clauses 3 or 4, wherein the noise level is based on an average magnitude of a set of transform coefficients of the plurality of transform coefficients that falls within the noise band.
6. The method of any one of clauses 3 to 5, further comprising determining, for each set of photon transients, an energy of transform coefficients within the noise band; determining, for each set of photon transients, an energy of transform coefficients outside of the noise band; and selecting a noise reduction algorithm based on a ratio of the energy of transform coefficients within the noise band to the energy of transform coefficients outside of the noise band.
7. The method of any one of clauses 3 to 6, further comprising determining, for each set of photon transients, a noise threshold based on the noise level; and modifying, for each set of photon transients, the subset of the plurality of transform coefficients that fall below the noise threshold to zero.
8. The method of any one of clauses 3 to 7, further comprising generating, for each set of photon transients, a set of intensity values corresponding to the pixel locations associated with the set of photon transients; calculating, for each set of intensity values, a second plurality of transform coefficients; and performing an element-wise multiplication between the second plurality of transform coefficients and elements of the first plurality of transform coefficients thereby generating the plurality of modified transform coefficients.
9. The method of any one of clauses 3 to 8, further comprising modifying, for each set of photon transients, at least a subset of the plurality of transform coefficients based on the noise level and the photon flux estimates, thereby generating a second plurality of modified transform coefficients; calculating, for each set of photon transients, an inverse transform using the second plurality of modified transform coefficients associated with that set of photon transients, wherein the inverse transform produces a second set of modified photon transients; generating, for each pixel location, the initial photon flux estimates based on each modified photon transient in the second set of modified photon transients associated with that pixel location.
10. The method of clause 9, further comprising generating the second plurality of modified transform coefficients using Wiener filtering.
11. The method of any one of clauses 1 to 10, further comprising generating, for each of the plurality of pixel locations, a second set of photon transients including a photon transient associated with that pixel location and photon transients associated with neighboring pixel locations based on the photon flux estimates; associating, for each second set of photon transients, one or more sets of photon transients corresponding to the one or more similar scene patches to the scene patch associated with that set of photon transients, thereby generating a plurality of 4D sets of photon transients; calculating, for each of the plurality of 4D sets of photon transients, a plurality of transform coefficients; estimating, for each set of photon transients, a noise level based on a noise band and the plurality of transform coefficients calculated for that 4D set of photon transients, wherein the noise band is based on a profile of a light source used to generate the photon transients;

modifying, for each 4D set of photon transients, at least a subset of the plurality of transform coefficients based on the noise level, thereby generating a third plurality of modified transform coefficients; calculating, for each 4D set of photon transients, an inverse transform using the third plurality of modified transform coefficients associated with that set of photon transients, wherein the inverse transform produces a third set of modified photon transients; generating, for each pixel location, second photon flux estimates based on each modified photon transient associated with that pixel location in the third set of modified photon transients.

12. The method of clause 11, wherein the transform is a Fourier transform, and the transform coefficients are Fourier coefficients.

13. The method of any one of clauses 11 or 12, wherein the noise level is based on an average magnitude of a set of transform coefficients of the plurality of transform coefficients that falls within the noise band.

14. The method of any one of clauses 11 to 13, further comprising determining, for each 4D set of photon transients, an energy of transform coefficients within the noise band; determining, for each 4D set of photon transients, an energy of transform coefficients outside of the noise band; and selecting a noise reduction algorithm based on a ratio of the energy of transform coefficients within the noise band to the energy of transform coefficients outside of the noise band.

15. The method of any one of clauses 11 to 14, further comprising determining, for each 4D set of photon transients, a noise threshold based on the noise level; and modifying, for each 4D set of photon transients, the subset of the plurality of transform coefficients that fall below the noise threshold to zero.

16. The method of any one of clauses 11 to 15, further comprising generating, for each 4D set of photon transients, a set of intensity values corresponding to the pixel locations associated with the set of photon transients; calculating, for each 4D set of intensity values, a third plurality of transform coefficients; and performing an element-wise multiplication between the third plurality of transform coefficients and elements of the plurality of transform coefficients associated with that 4D set of photon transients thereby generating the third plurality of modified transform coefficients.

17. The method of any one of clauses 11 to 16, further comprising modifying, for each 4D set of photon transients, at least a subset of the plurality of transform coefficients based on the noise level and the second photon flux estimates, thereby generating a third plurality of modified transform coefficients; calculating, for each 4D set of photon transients, an inverse transform using the third plurality of modified transform coefficients associated with that 4D set of photon transients, wherein the inverse transform produces a third set of modified photon transients; and generating, for each pixel location, the final photon flux estimates based on each modified photon transient in the third set of modified photon transients associated with that pixel location.

18. The method of clause 17, further comprising generating the third plurality of modified transform coefficients using Wiener filtering.

19. A system for generating single-photon imaging data with improved signal-to-noise ratio, comprising: at least one processor that is configured to: perform a method of any of clauses 1 to 18.

20. A non-transitory computer-readable medium storing computer-executable code, comprising code for causing a computer to cause a processor to: perform a method of any of clauses 1 to 18.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 5 can be executed or performed in any suitable order or sequence not limited to the order and sequence shown and described in the figures. Also, some of the above steps of the processes of FIG. 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for generating imaging data comprising:

a processor;

a circuit electrically connected to the processor to communicate a dataset comprising outputs from an array of single-photon detectors during a time period; and a memory having stored thereon a set of instructions which, when executed by the processor, cause the system to:

determine a number of first local groupings of data values that comprise a data value representing a given pixel at a given time during the time period, based on spatiotemporal information of the dataset;

filter noise from each of the number of first local groupings of data values;

generate an initial intensity estimate for the number of first local groupings of data values;

identify correlations in intensity information between the first local groupings comprising the given pixel and non-local groupings that do not contain the given pixel;

and recover a final intensity estimate for the given pixel at the given time based the initial intensity estimates of the first local groupings and the non-local groupings.

2. The system of claim 1, further comprising:
a light source; and
an image sensor comprising at least a subset of the array of single-photon detectors;
wherein the set of instructions, when executed by the processor, further cause the system to:
cause the light source to emit at least one pulse toward a scene, the pulse having a known attribute; and
remove pure noise from the first local groupings of data, based upon a determination that data values within the first local groupings of data do not exhibit the known attribute.

3. The system of claim 1, wherein at least some single-photon detectors of the array of single-photon detectors form a detector of a fluorescence lifetime imaging microscopy (FLIM) device, and wherein the dataset comprises raw photon data generated by the FLIM device.

4. The system of claim 1, wherein the array of single-photon detectors form at least a portion of a detector of a light detection and ranging (LIDAR) device, and wherein the dataset comprises raw photon data generated by the LIDAR device.

5. The system of claim 1, wherein the array of single-photon detectors comprises one or more high-time resolution sensors.

6. The system of claim 1, wherein the first local groupings comprise cubelets representing photon transient data associated with a first single photon detector and photon transients associated with neighboring single photon detectors of the array of single photon detectors.

7. The system of claim 1, wherein the instructions, when executed by the processor, further cause the system to generate an aggregated intensity estimate for the given pixel at the given time, based upon intensity information of the first local groupings comprising the given pixel at the given time.

8. The system of claim 1, wherein noise is filtered based on performing a transform on data values of the first local groupings and removing data that falls within a noise profile.

9. The system of claim 8, wherein the instructions, when executed by the processor, further cause the system to:
determine a set of 4D photon transient cubes for each local and non-local grouping;
determine an energy of transform coefficients within a noise band for the set of 4D photon transient cubes;
determine, for the set of 4D photon transient cubes, an energy of transform coefficients outside of the noise band; and select a noise reduction algorithm based on a ratio of the energy of transform coefficients within the noise band to the energy of transform coefficients outside of the noise band.

10. The system of claim 7 wherein the aggregated intensity estimate is determined according to a weighted average of initial intensity estimate values for the given pixel at the given time within each of the first local groupings.

11. The system of claim 1, wherein the instructions, when executed by the processor, further cause the system to determine a distance of a scene point from a given detector of the array of single-photon detectors, based on the final intensity estimate.

12. A method for processing raw photon data from a single-photon detector comprising:
generating an initial photon flux estimate based on a first set of photon transients including a photon transient associated with the single-photon detector and photon transients associated with neighboring detectors;
wherein each of the photon transients comprises a histogram of photon counts during a plurality of time bins;
identifying one or more similar sets of photon transients using intensity information; and
generating, for the single-photon detector, a final photon flux estimate based on a second set of photon transients including information from the first set of photon transients and the one or more similar sets of photon transients.

13. The method of claim 12, wherein the raw photon data was received via a fluorescence lifetime imaging microscopy (FLIM) device, and comprises FLIM data.

14. The method of claim 12, wherein the raw photon data was received via a light detection and ranging (LIDAR) device, and comprises LIDAR data.

15. The method of claim 12, wherein the raw photon data comprises frame data of a high time resolution.

16. The method of claim 12, wherein the final photon flux estimate comprises less contribution from ambient light than the raw photon data.

17. The method of claim 12, further comprising removing noise from the first set of photon transients based on a correlation between flux information of the photon transients and a known modulation profile of incoming light.

18. The method of claim 12, wherein the similar sets of photon transients comprise flux information indicative of a feature of an incoming light signal that is also indicated by flux information of the first set of photon transients.

19. The method of claim 18, further comprising determining a set of transform values for the first set of photon transients and the one or more similar sets of photon transients.

20. The method of claim 19 further comprising generating the final photon flux estimate based on a 4D photon transient set comprising local and non-local correlations of the first set of photon transients and the one or more similar sets of photon transients.

* * * * *